United States Patent [19]
Arita et al.

[11] Patent Number: 5,432,530
[45] Date of Patent: Jul. 11, 1995

[54] POINTING DEVICE AND METHOD OF CONTROL OF SAME

[75] Inventors: Takashi Arita; Akihiko Sakaguchi; Masanori Okahashi; Toshiaki Tanaka, all of Kawasaki, Japan

[73] Assignee: Fujitsu Limited, Kawasaki, Japan

[21] Appl. No.: 961,701

[22] PCT Filed: May 15, 1992

[86] PCT No.: PCT/JP92/00629

§ 371 Date: Jan. 11, 1993

§ 102(e) Date: Jan. 11, 1993

[87] PCT Pub. No.: WO92/21084

PCT Pub. Date: Nov. 26, 1992

[30] Foreign Application Priority Data

May 15, 1991 [JP] Japan .................. 3-110462
Sep. 30, 1991 [JP] Japan .................. 3-251469
Dec. 20, 1991 [JP] Japan .................. 3-338871

[51] Int. Cl.[6] .............................. G09G 5/08
[52] U.S. Cl. .................. 345/159; 273/148 B
[58] Field of Search ............... 74/471 XY; 340/706, 340/710, 709, 711; 345/156, 157, 159, 162, 163, 164, 168; 273/148 B

[56] References Cited

U.S. PATENT DOCUMENTS

| | | | |
|---|---|---|---|
| 4,433,217 | 2/1984 | Griffith | 200/5 |
| 4,562,347 | 12/1985 | Hovey et al. | 345/163 |
| 4,680,577 | 7/1987 | Straayer et al. | 340/711 |
| 4,698,626 | 10/1987 | Sato et al. | 340/710 |
| 4,712,101 | 12/1987 | Culver | 340/710 |
| 4,724,715 | 6/1988 | Culver | 340/710 |
| 4,786,768 | 11/1988 | Langewis et al. | 340/709 |
| 4,823,634 | 4/1989 | Culver | 340/710 |
| 4,868,549 | 9/1989 | Affinits et al. | 340/710 |
| 4,896,554 | 1/1990 | Culver | 340/706 |
| 4,905,174 | 2/1990 | Ouchi | 340/712 |
| 5,144,594 | 9/1992 | Gilchrist | 367/129 |
| 5,175,534 | 12/1992 | Thatcher | 345/157 |

FOREIGN PATENT DOCUMENTS

| | | |
|---|---|---|
| 3301156A1 | 7/1984 | Germany . |
| 3828416A1 | 2/1990 | Germany . |
| 0145419 | 11/1981 | Japan .................. 340/709 |
| 57-59231 | 4/1982 | Japan . |
| 58-94722 | 6/1983 | Japan . |
| 0179821 | 2/1984 | Japan .................. 340/710 |
| 2-115921 | 4/1990 | Japan . |
| 3243989 | 10/1991 | Japan: .................. 340/709 |
| 86/04166 | 7/1986 | WIPO . |
| WO91/06939 | 5/1991 | WIPO . |
| WO91/09363 | 6/1991 | WIPO . |

OTHER PUBLICATIONS

Patent Abstracts of Japan, vol. 14, No. 484 (P-1120) Aug. 2, 1990.
Supplemental European Search Report dated Feb. 8, 1994.

*Primary Examiner*—Richard Hjerpe
*Assistant Examiner*—Luh-Yi Lao
*Attorney, Agent, or Firm*—Armstrong, Westerman, Hattori, McLeland & Naughton

[57] ABSTRACT

A pointing device for moving a cursor on a display of a computer by a slider (1) to any position of the same, having a means for switching from positional control for controlling the position of the cursor to speed control for controlling the speed of movement of the cursor. The positional control and speed control of the cursor are switched in accordance with the range of movement of the slider.

30 Claims, 51 Drawing Sheets

Fig.3A
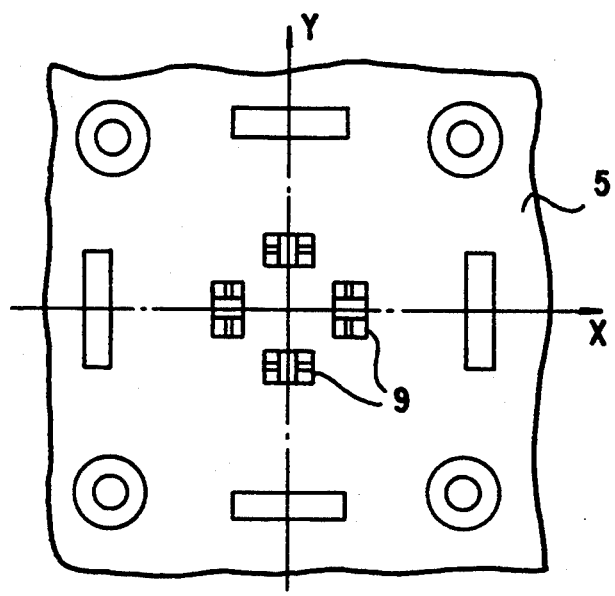
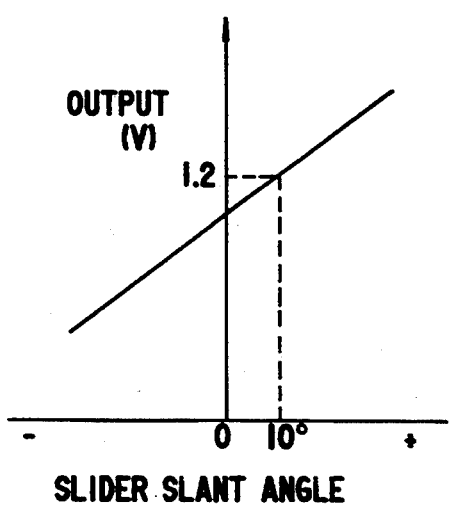
SLIDER SLANT ANGLE
Fig.3B 140  141

140

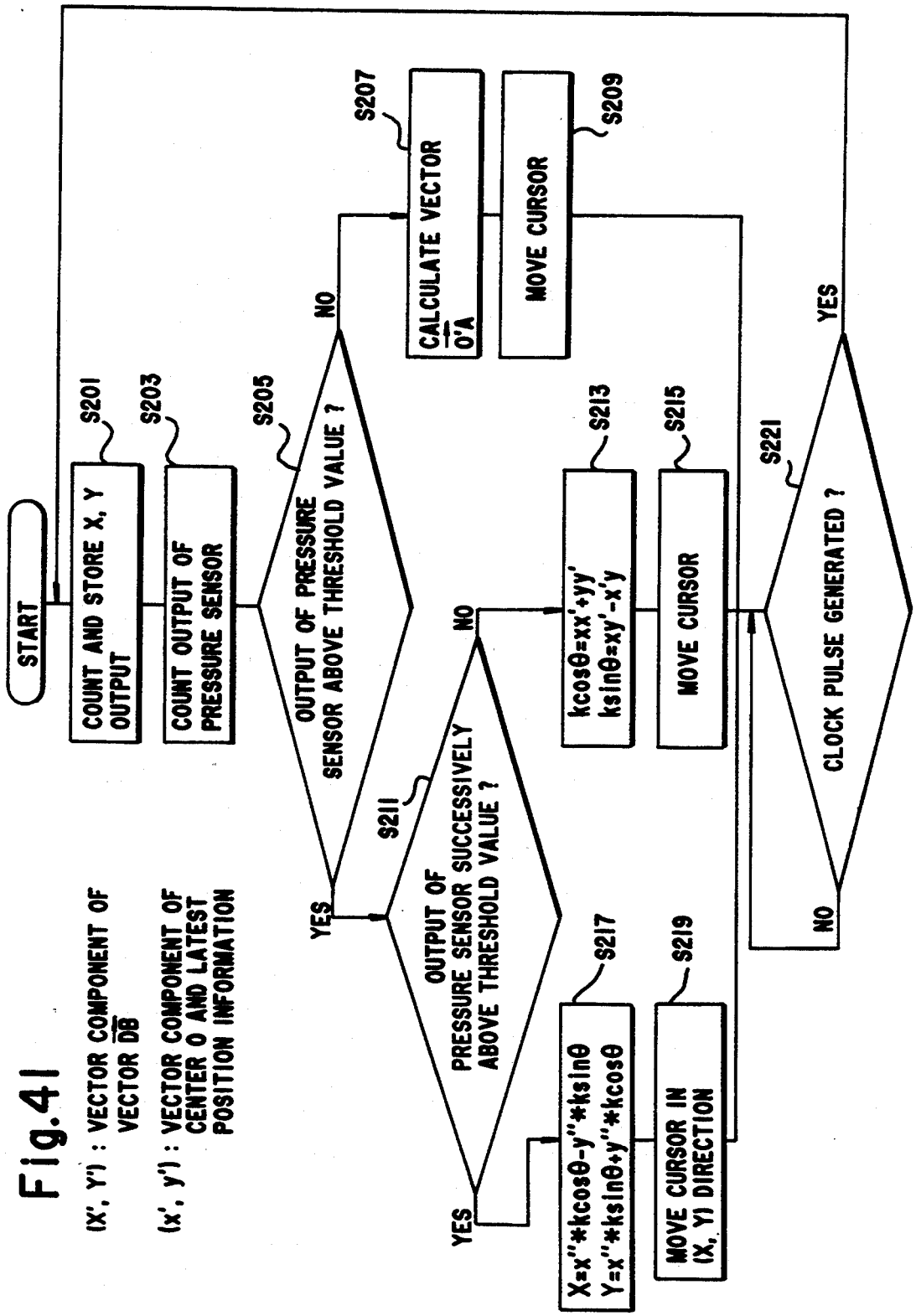

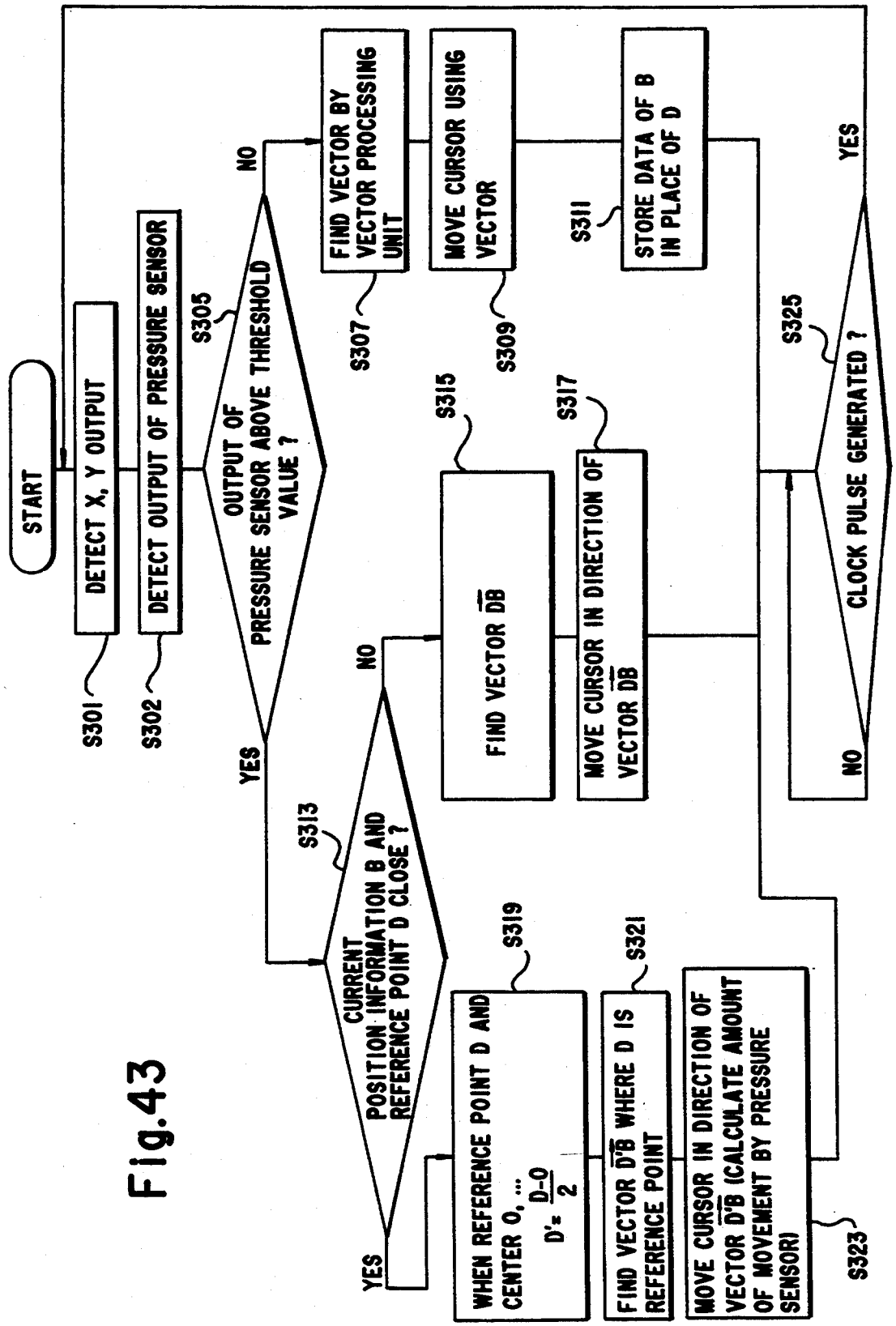

POINTING DEVICE AND METHOD OF CONTROL OF SAME

TECHNICAL FIELD

The present invention relates to a pointing device. More particularly, it relates to a pointing device for moving a pointer, cursor, or other position indicating member on a display of a computer to a desired position on the display and to a method of control of the same.

BACKGROUND ART

In the past, as an input means for data in data processing, use has been made of the method of displaying data by characters and figures on the screen of a display such as a CRT of a computer and preparing data while engaged in a dialogue operation through the keyboard and a digitizer, mouse, light pen, track ball, joystick, or other input means. For example, much use is made of these in the fields of CAD for data processing by graphics and simulation.

In recent years, even in the fields of data processing and office automation, due to the excellence of their operability, there has been an increase in the use of operating systems and application software which perform processing with a dialogue type operation which requires the use of a pointing device in addition to a keyboard. For example, mention may be made of operations using windows and operations using icons.

In a pointing device, it is required that not only the usage environment be expanded and operation by conventional tabletop installation be made possible, but also, for portability, that the pointing device be able to be used with the computer on the lap or on one's palm. Therefore, there has been the problem that conventional mouses and digitizers and other pointing devices require a large installation space and are therefore unsuitable for portable computers.

Due to the need for portable computers to be light in weight, small in size, and low in power consumption, the pointing devices also have to be light in weight, small in size, and low in power consumption.

In the past, pointing devices have been separate from the computers and have been electrically connected to them by a cable etc. Included among these were mouses, track balls, etc. FIGS. 49A and 49B are an outside view and a sectional view of a typical mouse.

In the figures, 1001 is a mouse-shaped case. At the bottom of the inside of the case 1001 is provided a ball 1002 which can turn in any direction. Further, 1003 is a printed circuit board, on which printed circuit board 1003 are mounted two detectors 1004 and 1005 for detecting the rotation of the ball 1002 in two directions, an IC 1006, a switch 1007, etc. On the top of the case 1001 are provided keytops 1008 for depressing the switches 1007.

During use, the device is slid over the tabletop so as to rotate the ball 1002, whose rotation is then detected by the two detectors 1004 and 1005. This pointing information is sent to the computer through the IC 1006 and the cable 1009 so as to move the pointer or cursor on the display.

In the above-mentioned conventional mouse, the mouse is operated by sliding it over a flat surface, so there was the problem that a large space was required and the operability was not that good.

Further, a conventional joystick will be explained with reference to FIG. 50.

The figure is a perspective view of a conventional joystick. In actuality, only the lever projects out and the rest is accommodated in the case of the keyboard etc. In FIG. 50, if the operating member, that is, the lever 1021, is shifted in a predetermined direction, the X direction and Y direction transmission plates 1022 and 1023 cause the encoders 1024 and 1025 of those directions to operate, whereby the slant angle and direction of the lever 1021 are detected. The movement of the cursor etc. on the display is controlled based on the results of the detection. In this joystick, speed control is performed so that the speed of movement of the cursor changes in accordance with the slant angle of the lever 1021. When it is returned to the origin, where it is not slanted, the cursor stops. Further, the joystick is constructed so that when the lever is released it returns to the origin by the return spring 1026.

FIGS. 51A and 51B are a top view of FIG. 50 and a view of the movement of the cursor on the display corresponding to the operation of the joystick.

In FIG. 51A, when the lever 1021 is shifted from the origin O to the point A, as shown in FIG. 51B, the cursor 1028 moves to the position "$P_1$" on the display 1027. When the cursor 1028 is subsequently to be moved to the position "$P_3$", the lever 1021 must first be returned to the origin O, then tilted to the point B at the left. The operator viewing the display, however, often moves the lever 1021 from the point A as is to the point C on impulse. If the lever is not returned to the origin O, however, the cursor 1028 moves at all times in direction and slant angle, so the cursor 1028 actually ends up moving to the position of "$P_2$". Therefore, to move the cursor 1028 to the position of "$P_3$", a further lever operation is required. If the operator is unfamiliar with this, an unnecessary operation easily occurs. Even when one is familiar with it and returns the lever to the origin O, the operation is troublesome.

Even with a track ball, usually the cursor is moved and stopped at the position corresponding to the absolute position of the ball, but control is sometimes performed so that the cursor continues moving by depressing a switch provided around the ball, for example, a pressure sensitive element, in accordance with the pressure on the same. This has a similar problem as with the above joystick.

DISCLOSURE OF THE INVENTION

The object of the present invention is to realize a pointing device which is small in size, low in power consumption, able to be mounted on a portable computer, and is excellent in operability.

The pointing device of a first aspect of the present invention has a positional control means for controlling the position of the pointer, cursor, or other position indicating member on the display, a speed control means for controlling the speed of movement of the position indicating member, and a switching means for switching from positional control to speed control when the position indicating member has moved beyond a predetermined region.

According to another aspect of the present invention, the pointing device is comprised of a slider which can move in any direction, a pointer movement position signal detection means which detects the direction of movement and the amount of movement of the slider and outputs a pointer movement position signal, and a pointer movement speed signal output means which, when the slider moves beyond a certain region, switches the pointer control from positional control to speed control and outputs a pointer movement speed signal.

By moving the slider in the desired direction, a pointer movement position signal is output from the pointer movement position signal output means and the pointer can be moved to the desired position. Further, by moving the slider beyond a certain region, the pointer positional control is switched to speed control, a pointer movement speed signal is output from the pointer movement speed signal output means, and the pointer can be moved quickly to the desired position. This enables the device to be made small in size since the range of movement of the slider is reduced.

Further, if provision is made, in the region where the above-mentioned slider moves and between the region where the pointer movement position signal is output and the region where the pointer movement speed signal is output, of an insensitive zone where the pointer does not move, or if a difference is given to the feeling of movement between the two, the operability is improved.

According to another aspect of the present invention, the pointing device is comprised provided with a slider slidable in any direction, a detection means for detecting the amount of movement of the slider, one or more button switches, keytops for depressing the button switches, and a case housing the same, wherein the button switches operate when the keytops are depressed from the top direction or the side direction of the case.

The case may be supported by a support arm which may be bent in any direction at any position. Further, according to another feature of the present invention, the pointing device is comprised provided with a slider slidable in any direction, a detection means for detecting the amount of movement of the slider, one or more button switches, and a case for accommodating the same, wherein the case is a substantially rectangularly shaped box and has a projection at one end of its bottom, with the slider being disposed at the opposing surface.

According to a preferable embodiment of the present invention, the pointing device for moving a pointer or a cursor on a display of a computer to any position of the display is comprised of a slider which can move in at least an X direction and Y direction, a detector which detects the position of the slider in the X direction and Y direction along with its movement, and a computer which has a position information memory which successively stores position information obtained by the detector at predetermined timings and a vector processing unit which compares the latest position information and the preceding position information stored by the position memory so as to compute the relative positional relationship of the two and outputs a signal for moving the cursor or pointer on the display based on the results of the same.

The present invention is also directed to a method of control of the pointing device.

According to one embodiment, there is provided a method of control of a pointing device for moving a cursor or pointer on a display to any position on the display, characterized by storing position information of the slider at predetermined intervals, comparing the latest position information and the preceding position information, and thereby detecting the relative positions of the two and moving the cursor or pointer.

Switching is performed between positional control and speed control of the cursor or pointer in accordance with the range of movement of the slider.

Preferably, when shifting from positional control to speed control, the latest positional information and the preceding positional information are used to find the vector between the two positions of the same and the vector is corrected in angle by exactly a predetermined angle while the slider is in the speed control region.

Further, preferably, when the latest position information and the preceding position information approach each other more than a predetermined value, the preceding position information is replaced by fixed position information further preceding it from the latest position information.

Also, when the slider is moved from an initial position to a predetermined position and then returned toward the initial position, the output of the movement signal of the cursor or pointer may be canceled so as not to move the cursor or pointer.

BRIEF DESCRIPTION OF THE DRAWINGS

FIGS. 3A and 3B are views showing the arrangement and output of the magnetoelectric conversion elements in the first embodiment of the present invention.

FIGS. 4A and 4B are views for explaining the mode of operation of the first embodiment of the present invention, wherein FIG. 4A is a view showing the state of positional control of pointer movement and FIG. 4B is a view showing the state of speed control of the pointer movement.

FIGS. 9A and 9B are views showing a fourth embodiment of the present invention, wherein FIG. 9A is a sectional view and FIG. 9B is a perspective view showing the spring member.

FIGS. 13A, 13B, and 13C are views showing a sixth embodiment of the present invention, wherein FIG. 13A is a frontal view, FIG. 13B is a side view, and FIG. 13C is a top view.

FIGS. 15A, 15B, and 15C are views showing the actual state of operation of a sixth embodiment of the present invention using fingers, wherein FIG. 15A is a frontal view, FIG. 15B is a side view, and FIG. 15C is a top view.

FIGS. 20A, 20B, and 20C are views for explaining the connection portions of the support arm in the seventh embodiment of the present invention, wherein FIG. 20A is a perspective view of the support arm, FIG. 20B is a sectional view showing the connection portion of the device, and FIG. 20C is a sectional view of the fixing portion for fixing the device to the computer.

FIG. 41 is a flow chart of another embodiment than FIG. 38.

FIG. 43 is a flow chart of the speed control of the cursor movement of the present invention.

BEST MODE FOR CARRYING OUT THE INVENTION

Figure 1:
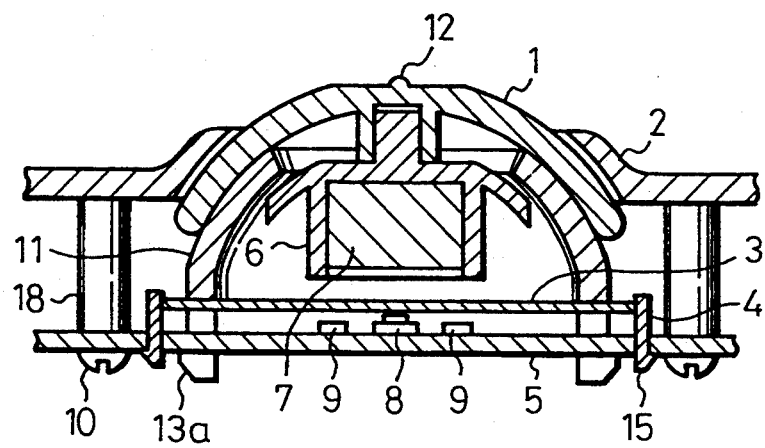
FIG. 1 is a sectional view showing a first embodiment of the present invention.
Figure 2:
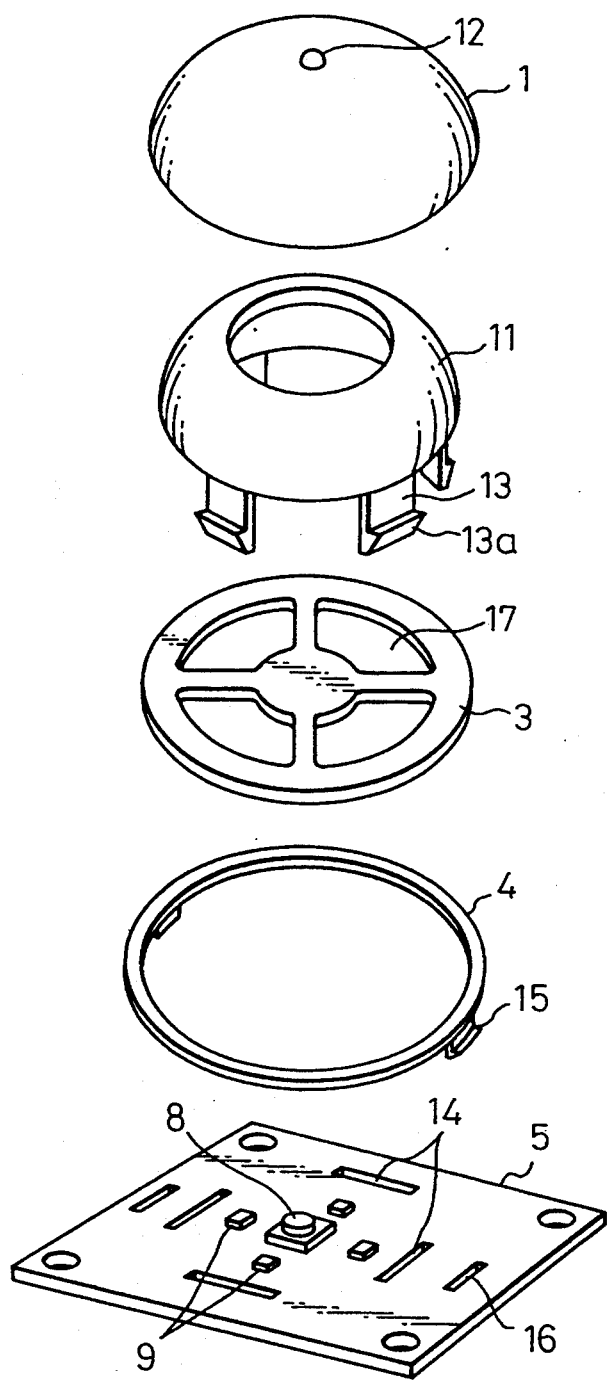
FIG. 2 is a disassembled perspective view showing the first embodiment of the present invention.

FIG. 1 and FIG. 2 are views showing a first embodiment of the present invention, wherein FIG. 1 is a sectional view and FIG. 2 is a disassembled perspective view.

In the two figures, 1 is a slider, 2 is a case, 3 is a keytop, 4 is s keyring, 5 is a printed circuit board, 6 is a magnet holder, 7 is a magnet, 8 is a depression switch, 9 is a magnetoelectric conversion element, 10 is a screw for attaching the printed circuit board to the case, and 11 is a housing.

The slider 1 forms a dome in shape and is designed to be able to be slid in any direction on a housing 11 with the top cut out in a similar dome shape. On the top surface of the slider 1 is formed a small projection 12 to enable easy recognition of the position of the origin, while at the bottom surface there is attached by an adhesive etc. a magnet holder 6 holding the magnet 7. Note that for the magnet 7, use is preferably made of a magnet which is small in size but strong in magnetic force, such as a samarium cobalt magnet.

The housing 11 is provided at its bottom with a plurality (four in illustrated embodiment) of engagement pieces 13 which are inserted into the holes 14 made in the printed circuit board in a snap-like attachable/detachable manner by elastic deformation force. The pawls 13a affix it to the printed circuit board 5. The printed circuit board 5 is provided with a depression switch 8 at a position facing the magnet 7 and a plurality (four in illustrated embodiment) magnetoelectric conversion elements 9. Further, a keyring 4 surrounds the housing 11 and has a plurality (two in illustrated embodiment) of engagement pieces 15 which insert into the holes 16 made in the printed circuit board 5 in a snap-like attachable/detachable manner by elastic deformation force. In the keyring 4 there is slidingly provided a disk-shaped keytop 3 which has holes 17 through which the engagement pieces 13 pass.

The case 2 is provided with a circular window 2a for operation of the slider 1. Further, the printed circuit board 5 is affixed through the bosses by the screws 10.

Note that the magnetoelectric conversion elements 9 are small in size and large in detection output, for example, suitably are Hall elements or MR elements. They are arranged, as shown in FIG. 3A, in pairs about the X-axial direction and Y-axial direction. In this case, one each may also be provided, but when considering the level of the output voltage and the linearity, the provision of two for each axis makes control easier.

Figure 4A:
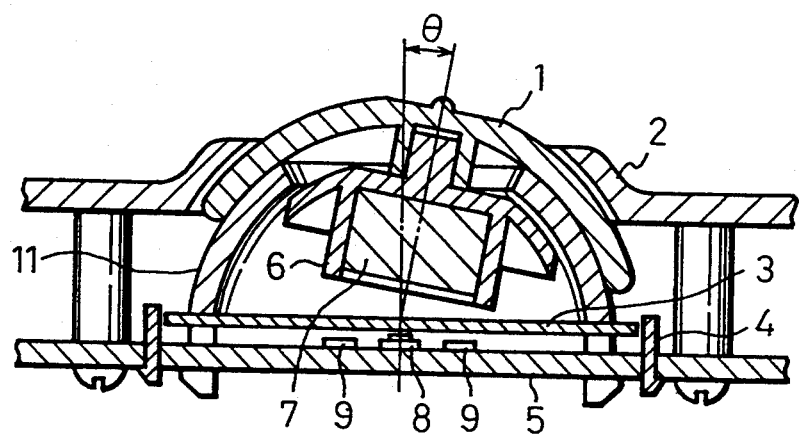

The embodiment constructed in this way, as shown in FIG. 4A, enables the slider 1 to be slid in any direction. If the slider 1 is slid, the magnet 7 slants and the magnetic flux density cutting across the magnetoelectric conversion elements 9 changes, along with which the output voltage changes. The relationship of the slant angle 8 of the slider 1 at this time and the output voltage from the magnetoelectric conversion elements 9 becomes as shown in FIG. 3B as one example. The output from the magnetoelectric conversion elements 9 changes the slant angle of the slider 1 into changes in voltage. For example, if the slider 1 is slanted 10° with respect to the X-axial direction, the output voltage changes to 1.2 V. The changes in voltage at this time may be changed to changes in relative position to control the position of the pointer.

Figure 4B:
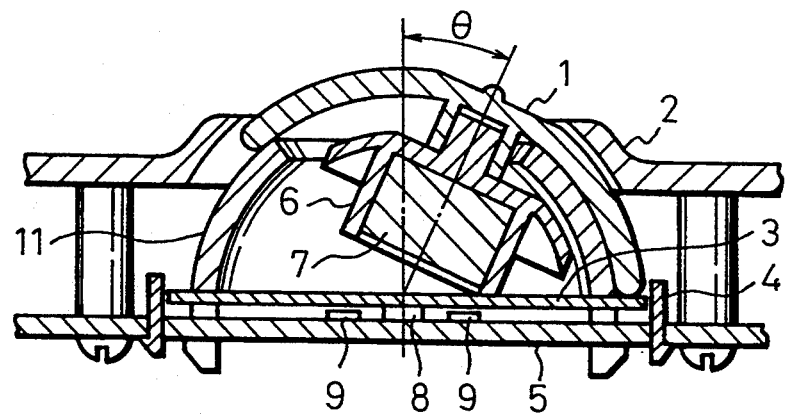

Further, if the slider 1 is slid from the state shown in FIG. 4A to the state of FIG. 4B, the peripheral portion of the slider 1 depresses the keytop 3. The depressed keytop 3 descends guided by the keyring 4, depresses the depression switch 8, and closes the contact. When the depression switch 8 operates, the control of the pointer is changed from relative positional control to speed control. When the pointer moves at a certain speed and the slider 1 is slid further, the pointer is made to move at a quick speed.

Figure 5:
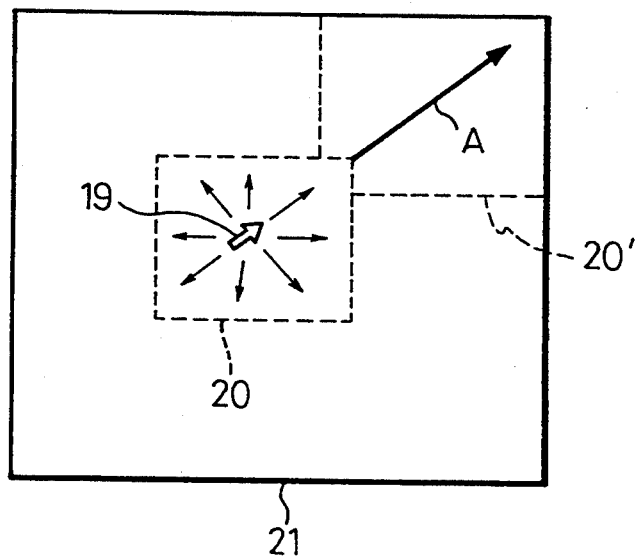
FIG. 5 is a view showing the results of control of the first embodiment of the present invention.

Using the above method, a pointer on an actual CRT can be controlled as shown in FIG. 5. In the figure, 19 is a pointer in a display, 20 is a positional control region, and 21 is the entire display portion of the CRT.

The pointer 19 may be moved in any direction in the positional control region 20 corresponding to the amount of sliding of the slider 1. When the pointer 19 goes beyond the positional control region 20 and the peripheral portion of the slider 1 depresses the depression switch 8 through the keytop 3, speed control is switched to and the pointer 19 may be moved for each positional control region 20 as shown by the arrow A for example in that direction, with the vector just before being stored.

According to this embodiment, as mentioned above, the pointer 19 may be moved quickly to the target region and then moved precisely to the target position. By joint use of this positional control and speed control, it is possible to reduce the amount of movement of the slider and therefore make the device smaller in size.

Figure 6A:
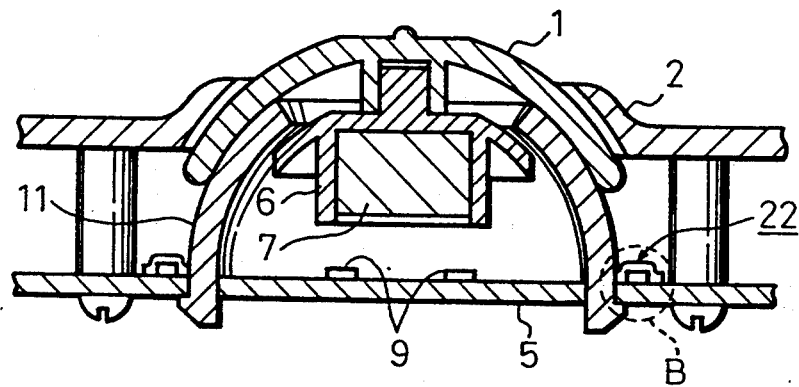
FIGS. 6A and 6B are a sectional view showing a second embodiment of the present invention and an enlarged perspective view of section B of FIG. 6A.
Figure 6B:
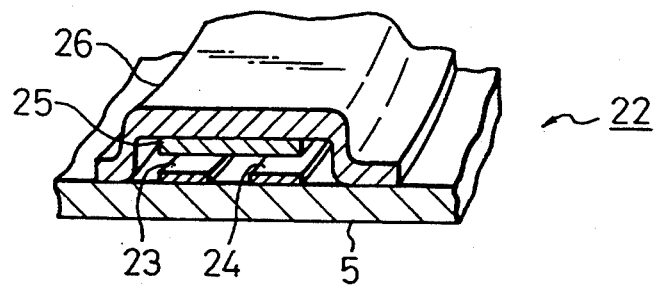

FIG. 6 is a view showing a second embodiment of the present invention, wherein FIG. 6A is a sectional view and FIG. 6B is an enlarged perspective view of section B of FIG. 6A. In the figure, portions the same as in FIG. 1 are given the same reference numerals. Note that 22 is a rubber switch, 23 and 24 are fixed contacts, 25 is a movable contact, and 26 is a rubber member.

This embodiment is basically the same as the first embodiment and differs only in the use of the rubber switch 22 in place of the depression switch 8 of the first embodiment. That is, the depression switch 8, keytop 3, and keyring 4 of the first embodiment are eliminated and instead a ring-shaped rubber switch 22 is provided around the housing 11.

The rubber switch 22, as shown in FIG. 6B, provides the printed circuit board 5 with two fixed contacts 23 and 24. Facing these, the movable contact 25 is attached to a ring-shaped rubber member 26 with elasticity.

In the second embodiment constructed in this way, by moving the slider 1 in the desired direction, it is possible to achieve the same action as in the first embodiment. The rubber member 26 depressed by the peripheral portion of the slider 1 bends, the movable contact 25 of the rubber switch 22 contacts the fixed contacts 23 and 23, and power is conducted between the same.

The rubber member 26 is comprised of an elastic material, so compared with when the slider 1 is sliding on the housing 11, a greater depression force is required in the interval when the rubber member 26 is depressed and the fixed contacts 23 and 24 are made conductive. By this, when changing from positional control to speed control, the operator can easily recognize the switching of the control since the force applied to the slider 1 must be changed.

Figure 7:
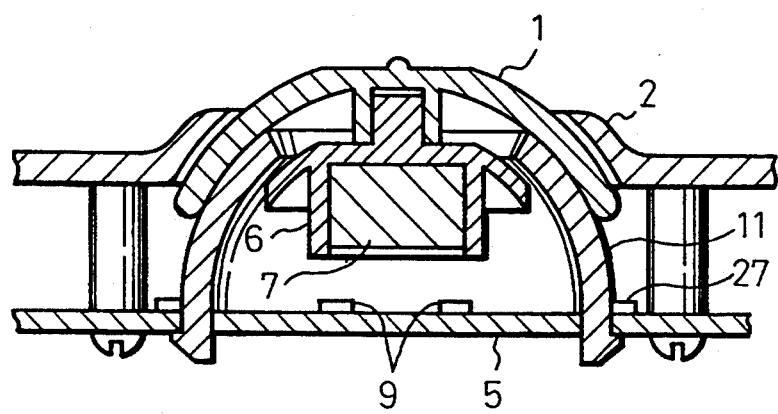
FIG. 7 is a sectional view showing a third embodiment of the present invention.
Figure 8:
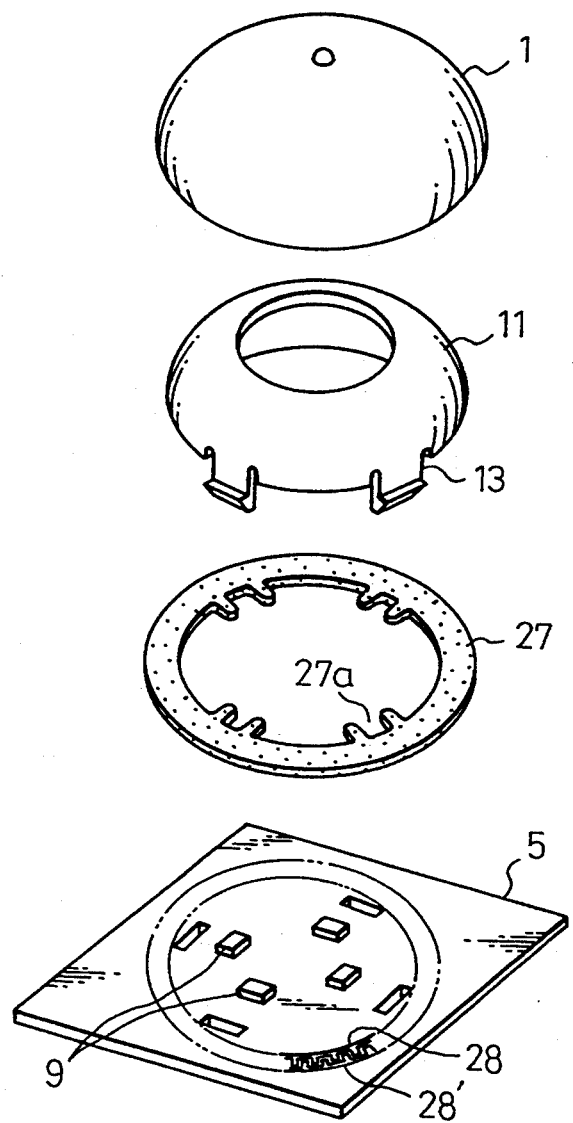
FIG. 8 is a disassembled perspective view of the third embodiment of the present invention.

FIG. 7 and FIG. 8 are views showing a third embodiment of the present invention, wherein FIG. 7 is a sectional view and FIG. 8 is a disassembled perspective view. In the two figures, portions the same as in FIG. 6 are given the same reference numerals. Note that 27 is a pressure sensor and 28 and 28' are comb-shaped electrodes.

The third embodiment is basically the same as the second embodiment and differs only in the use of the pressure sensor 27 in place of the rubber switch 22 of the second embodiment.

The pressure sensor 27 forms a ring having grooves 27a at a number of locations as shown in FIG. 8. These may be fit around the engagement pieces 13 of the housing 11 to fix the sensor in place. At the portion of the printed circuit board 5 where the pressure sensor 27 is attached, there are two comb-shaped electrodes 28, 28' assembled to form a ring.

In the third embodiment constructed in this way, if the slider 1 is slid and the peripheral portion pressures against the pressure sensor 27, the electrical resistance of the pressure sensor 27 falls, current flows from the comb-shaped electrode 28 through the pressure sensor 27 to the electrode 28', a switch operation is formed, and the pointer is switched from positional control to speed control. The rest of the operation is the same as in the previous embodiments.

Figure 9A:
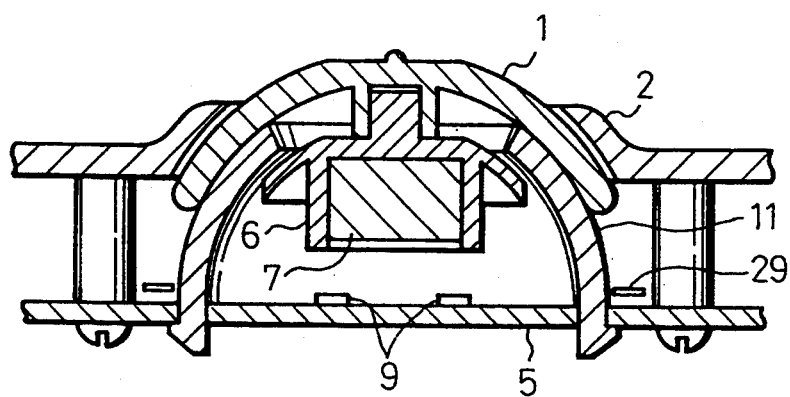
Figure 9B:
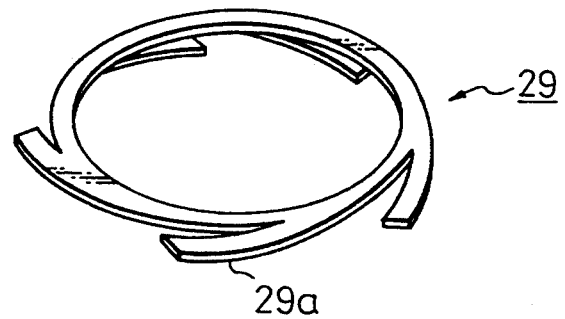

FIG. 9 is a view showing a fourth embodiment of the present invention, wherein FIG. 9A is a sectional view and FIG. 9B is a perspective view showing the spring member. Note that 29 is the spring member.

Figure 10:
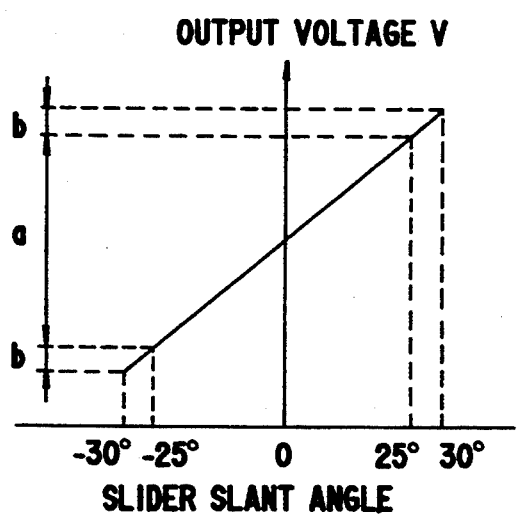
FIG. 10 is a view for explaining the method of voltage control of the fourth embodiment of the present invention.

The difference of the fourth embodiment from the third embodiment is that the pressure sensor 27 and the comb-shaped electrodes 28 on the printed circuit board of the third embodiment are eliminated and provision is made of a ring-shaped spring member 29 having a plurality of spring pieces 29a. The embodiment constructed in this way, when the slider 1 is slid, is designed so that the elasticity of the spring is transmitted to the slider 1 from the position where the slider 1 contacts the spring member 29, thereby making the slide feel heavier. FIG. 10 shows the method of voltage control at this time.

For example, when the slider 1 can be slanted up to 30°, positional control is performed in the range a of slant ±25° about 0°, while speed control is performed in the region b from 25° to 30° where the spring member 29 acts. At this time, to prevent mistaken operation during operation of the slider, the region from 25° to 27° is made a noncontrol region and the pointer on the CRT is made not to move, whereby it is possible to further improve the operability.

Figure 11:
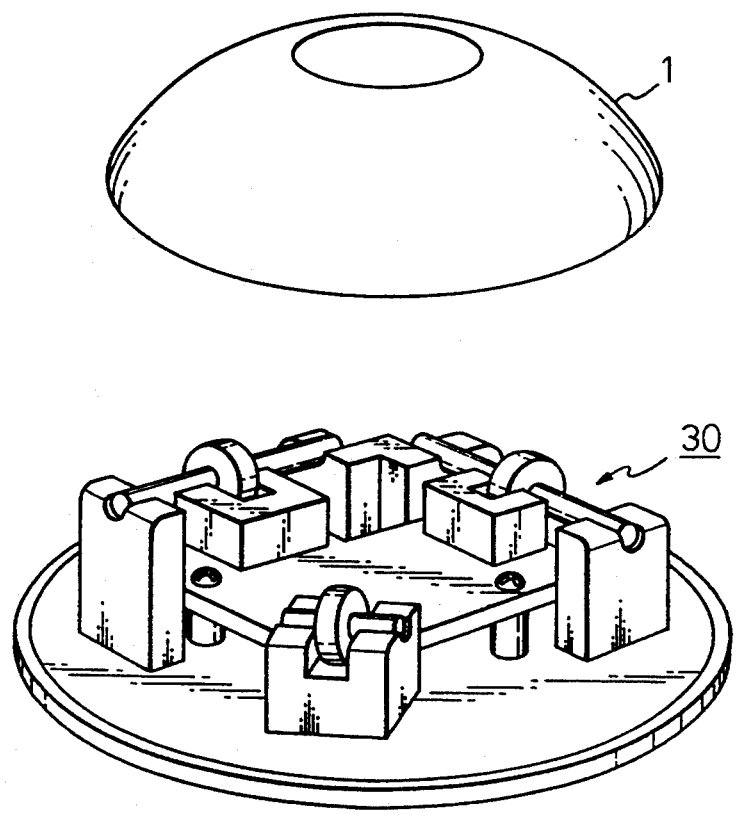
FIG. 11 is a view showing a fifth embodiment of the present invention.

FIG. 11 is a view showing a fifth embodiment of the present invention.

In the embodiment, instead of the magnetoelectric conversion elements, provision is made of a rotary encoder 30 able to detect the amount of movement in the X-axis and Y-axis under the slider 1. If the rest of the construction is made the same as the first to fourth embodiments, the same effect can be obtained.

Figure 12A:
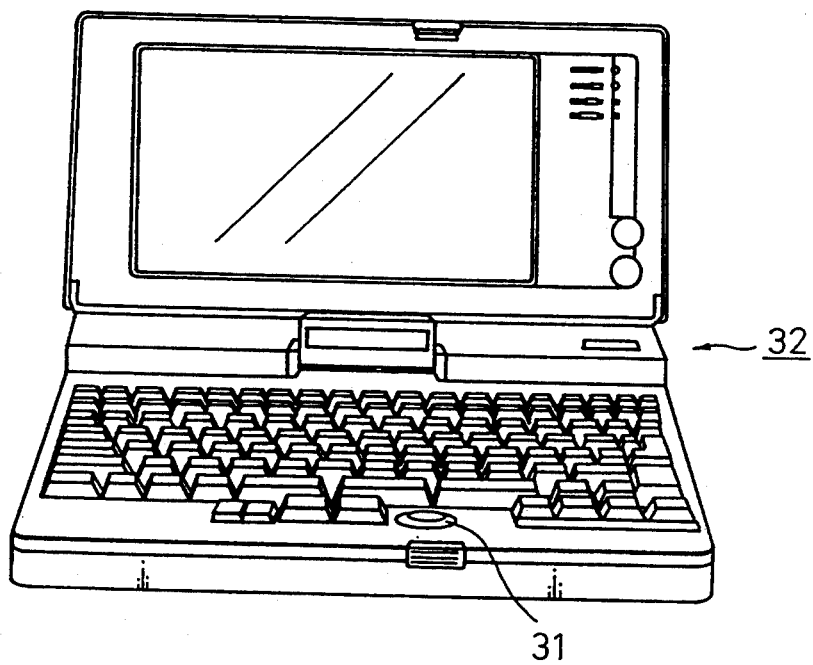
FIGS. 12A and 12B are views showing the state of assembly of the pointing device of the present invention into the portable computer and the state of use.
Figure 12B:
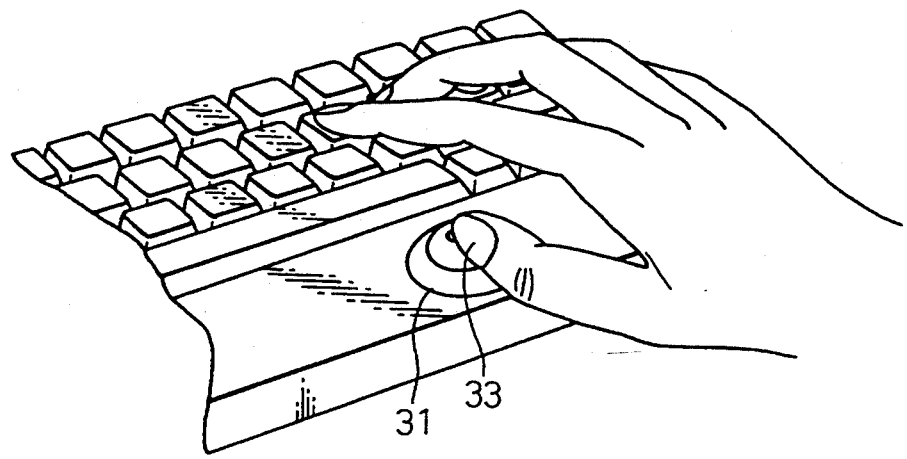

FIG. 12A is a view showing the state of assembly of the pointing device 31 of the present invention on a portable computer 32. Part of the slider 1 is exposed from the case 2. As shown in FIG. 12B, by using the finger 33 to slide the exposed portion, it is possible to control the pointer.

According to the present invention, by controlling the pointer by a positional control signal, it is possible to make the amount of movement of the slider small, so the device can be made small in size and light in weight. Further, by using magnetoelectric conversion elements for the detection of the amount of movement of the slider, it is possible to reduce the consumption of power and to provide a pointing device which is suited for mounting on a portable computer.

Figure 13A:
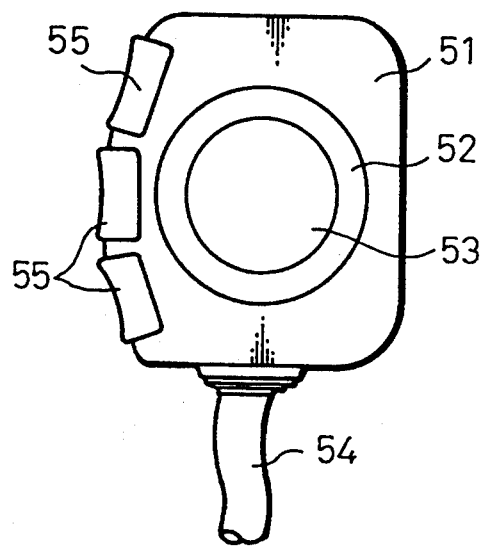
Figure 13B:
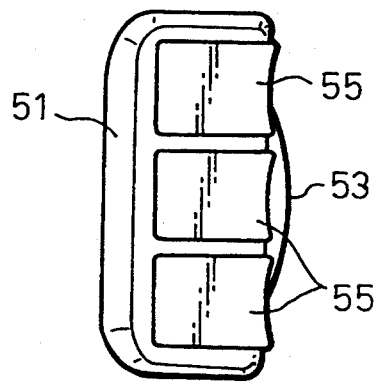
Figure 13C:
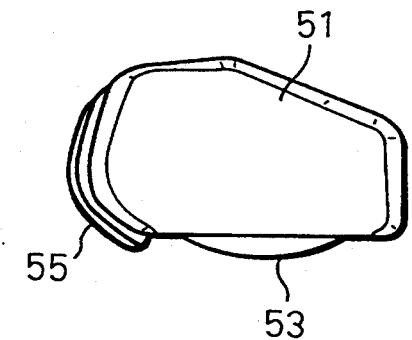

FIGS. 13A to 13C are a front view, side view, and top view of a sixth embodiment of the present invention.

The sixth embodiment focuses in particular on making the case a size enabling it to be fit in the palm or a size enabling it to be attached to a finger.

In the figure, 51 is a case, 52 a groove, 53 a dome-shaped slider, 54 a cable, and 55 keytops (ordinarily called mouse switches). The case 51 is of a size which can fit into the palm and a shape which can be easily grasped.

Figure 14:
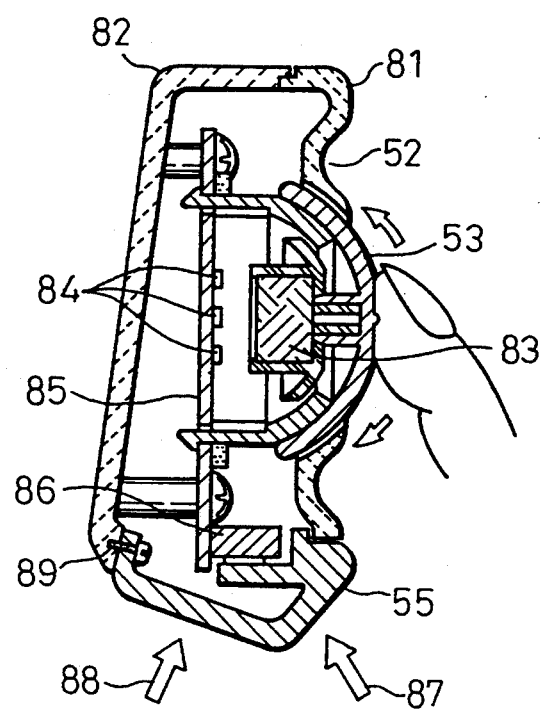
FIG. 14 is an enlarged cross-sectional view along the line XIV—XIV of FIG. 13.

FIG. 14 is a cross-sectional view along the line XIV—XIV of FIG. 13A.

In the figure, 81 is an upper case, 82 is a lower case, 83 is a permanent magnet, 84 is a magnetoelectric conversion element, 85 is printed circuit board, 86 is a button-switch, and 55 is a keytop for depressing the button switch. At the end of the lower case 83 there is a support point 89. Further, 90 is a housing supporting the slider 53 in a sliding manner and is affixed to the printed circuit board 85.

In the embodiment constructed in this way, when the slider 53 carrying the permanent magnet 85 is slanted by the finger, the magnetoelectric conversion element 84 mounted on the printed circuit board 85 detects the changes in the magnetic flux, converts the same into cursor control signals of the computer, transmits them through the cable 54, and outputs them to the computer. Further, when the keytop 55 is depressed, the button switch 86 mounted on the printed circuit board 85 is depressed and a signal is output.

At this time, the direction on which the keytop 55 is depressed by the finger may be either of the direction of the arrow 87 in the figure or the direction of 88. The switch is constructed to be depressible in either of these. This enables the support point of the keyswitch 55 to be placed at the position of 89.

Figure 15A:
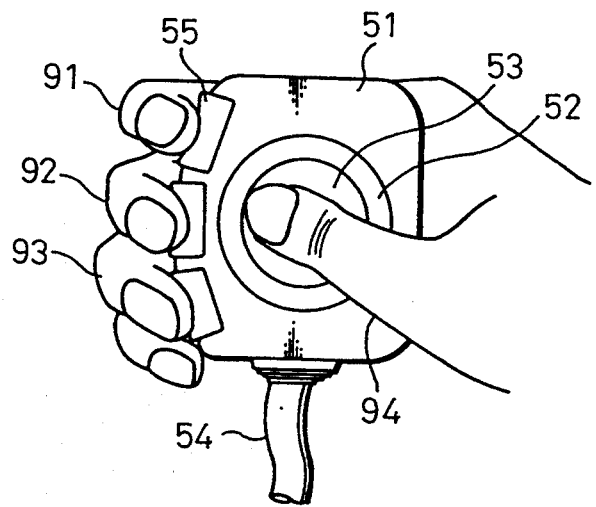
Figure 15B:
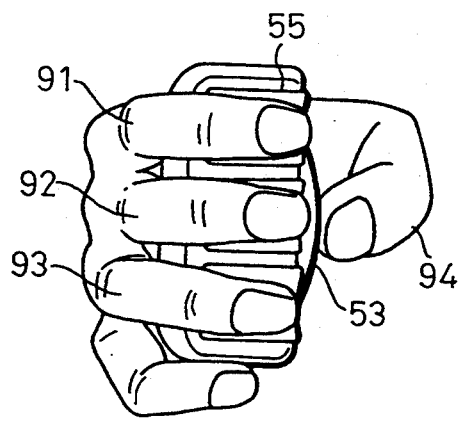
Figure 15C:
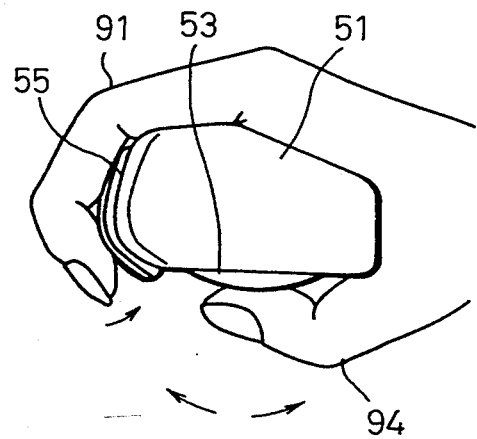

FIGS. 15A to 15C are a front view, side view, and top view showing the actual state of operation using fingers.

In the figure, 91 is an index finger, 92 the middle finger, 93 the ring finger, and 94 the thumb. The case 51 is shaped to be easily grasped by the hand. The keytops 55 are disposed at locations where the index finger 91, the middle finger 92, and the ring finger 93 can be easily placed. Further, a groove 52 is provided around the slider of the case 51 so as to facilitate the slanting of the slider 53 in any direction by the thumb 94. By making the base of the thumb abut against the case 51, it is possible to eliminate unstableness of the fingers.

The keytops 55 are constructed so they may be depressed at their support points by the second joints of the fingers.

Figure 16:
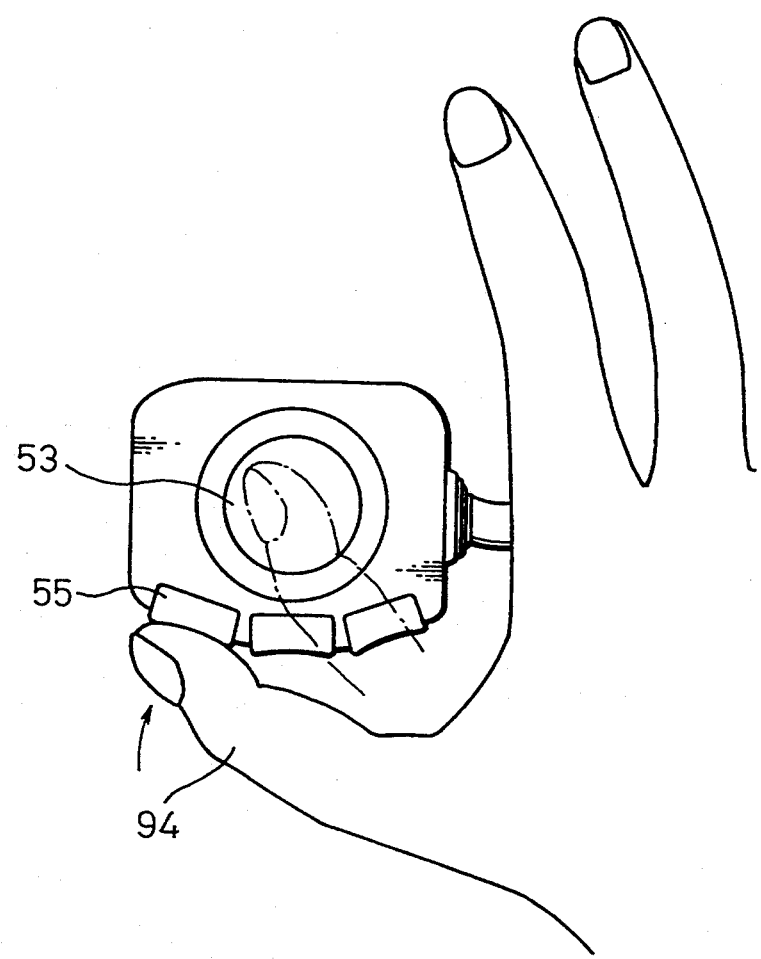
FIG. 16 is a view showing another method of depressing the keytops of the sixth embodiment of the present invention.

FIG. 16 shows another method of depressing the keytops. In this method, the device is not grasped and is operated with the slider portion placed on the top.

The keytops 55 are constructed so as to reliably depress the button switches 86 when they are depressed from the direction of the side surface of the case of a direction slanted from the side surface direction, so for example as shown in the figure, the keytops 55 can be depressed by the thumb 94 or the slider 53 can be operated by the thumb 94.

Figure 17:
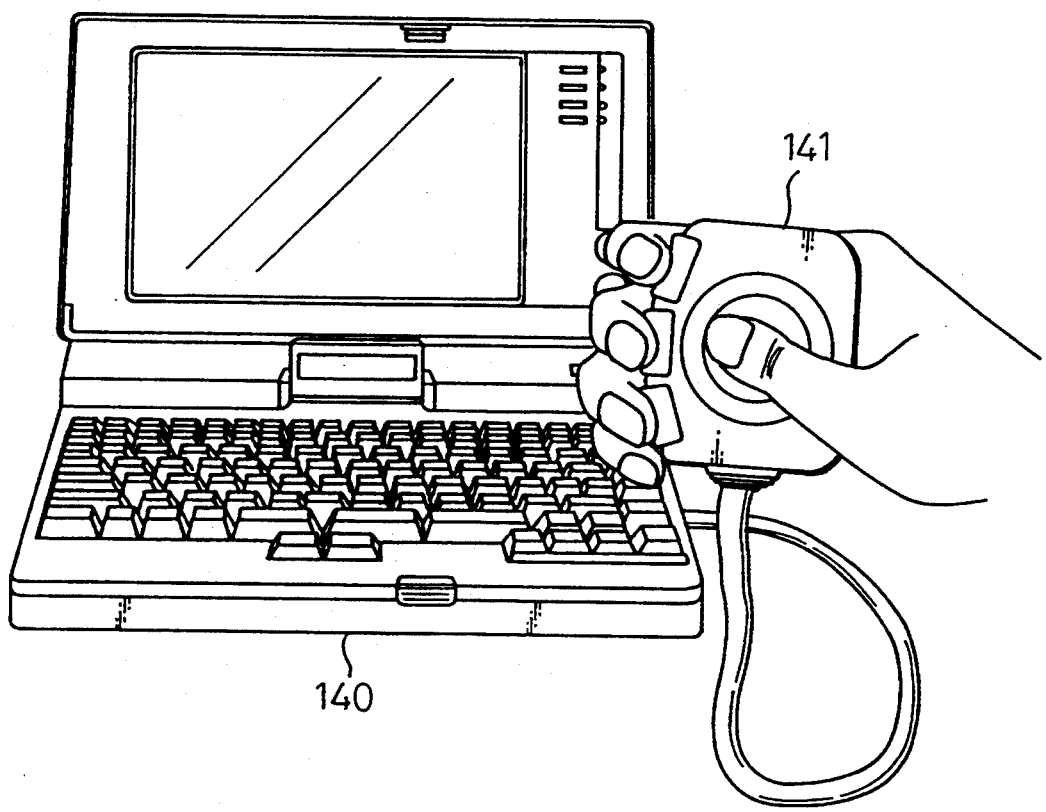
FIG. 17 is a view showing the state of operation of the sixth embodiment of the present invention connected to a portable computer.

FIG. 17 is a view showing the state of operation of the embodiment connected to a portable computer. According to this embodiment, the device is extremely small, so can be used with a small installation area and without requiring operating space. In the figure, 141 is the device body and 142 is the support arm of the device.

Figure 18:
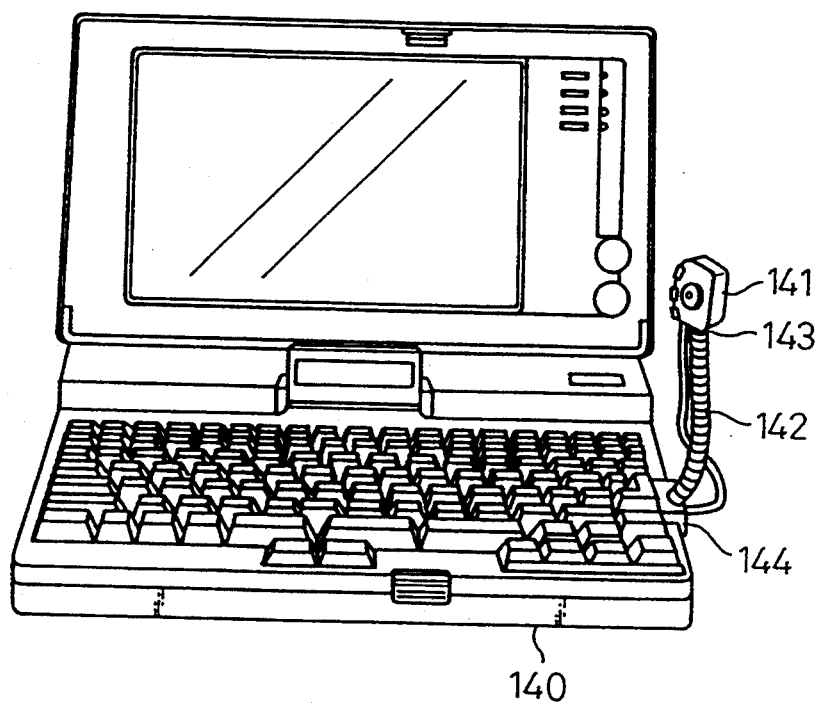
FIG. 18 is a view showing a seventh embodiment of the present invention together with a portable computer.

FIG. 18 is a view showing a seventh embodiment of the present invention together with a portable computer.

The support arm 142 has the device connection portion 143 provided at its tip and the computer connection portion 144 provided at its other end. The device body 141 is basically the same as in the embodiment shown in FIG. 17 and differs only in the provision of the connection portion to the support arm 142. The device body 141 can be connected to the computer and the slider operated even when attached to the support arm 142. Therefore, when controlling the cursor, the device can be immediately grasped, so the operability is excellent. Since the device is affixed to the computer, it is convenient for carrying.

Figure 19A:
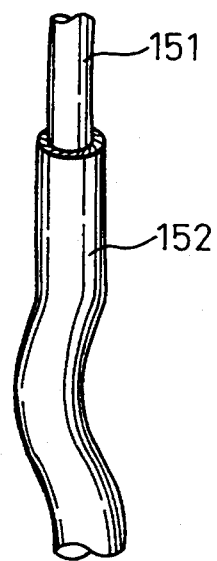
FIGS. 19A and 19B are views showing two examples of support arms in the seventh embodiment of the present invention.
Figure 19B:
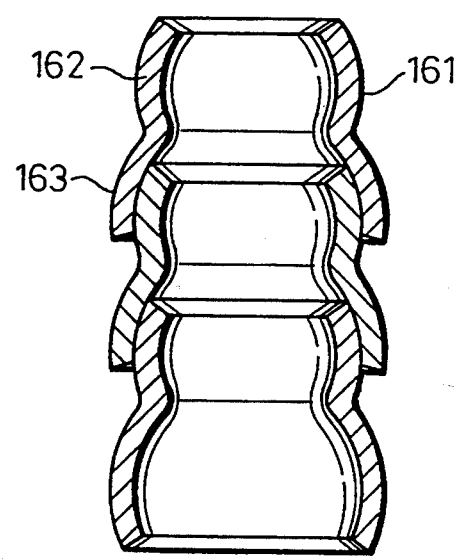

FIGS. 19A and 19B are views showing two examples of support arms 142.

In FIG. 19A, 151 is a wire and 152 is a covering. The wire 151 is made of a material which can be easily bent by finger force. The outside is covered with the covering 152 (for example, plastic).

FIG. 19B shows the support arm constructed by a plurality of cups 161. The cups 161 are formed by a large radius cup 163 and a small radius cup 162 in a figure-eight shape. The small radius cup 162 of one cup is fit into the large radius cup 163 of another cup to connect the cups. This enables bending freely in any direction at any position (flexible) and further enables rotation.

Figure 20A:
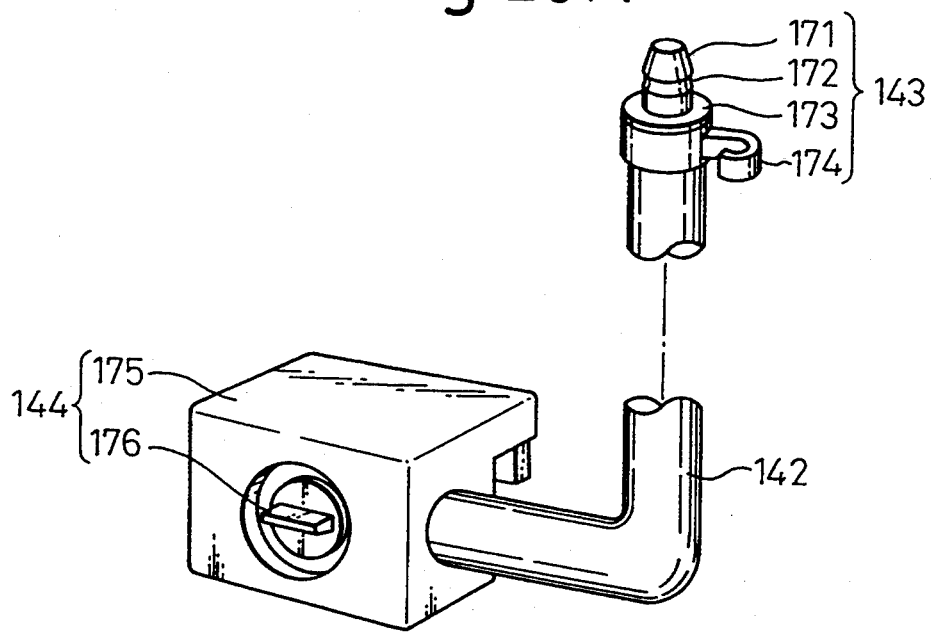
Figure 20B:
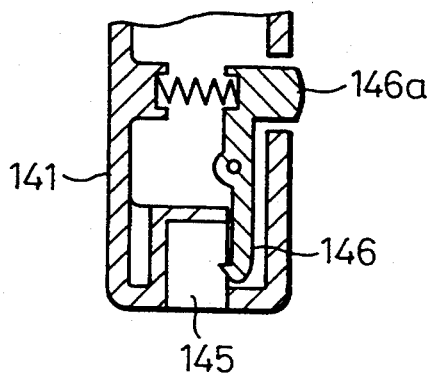
Figure 20C:
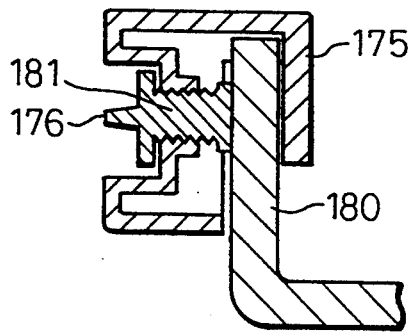

FIGS. 20A to 20C are views for explaining the connection portion at the tip of the support arm in the seventh embodiment of the present invention and the computer connection portion at the other end, wherein FIG. 20A is a perspective view of the support arm, FIG. 20B is a sectional view showing the connection portion of the device, and FIG. 20C is a sectional view of the fixing portion for fixing the device to the computer.

In FIG. 20A, 171 is a device connection pin, 172 is a connection groove, 173 is a stopper, and 174 is a cable hook. When the device connection pin 171 is inserted into the hole portion 145 of the device body 141 shown in FIG. 20B, the ratchet pawl 146 provided in the device body 141 engages with the connection groove 172 to affix the device. When removing the device 141, the button 146a of the ratchet pawl 146 is depressed to release the engagement of the ratchet pawl 146, thereby enabling detachment, so attachment and detachment are easy.

The cable hook 174 can catch and affix the cable and can be moved to any position of the support arm 142, so when bending the support arm, the cable can be held as desired by the user so as not to interfere with the operation.

The computer connection portion 144, as shown in the sectional view of FIG. 20C, is comprised of the case 175 and the screw portion 181 having the knob 176 and is designed so that the case 175 may be hung on the housing 180 of the portable computer and be clamped by the screw portion 181. Note that the knob 176 is provided with a depression in the case 175 so as to prevent turning by mistake. The knob is preferably kept from protruding outside the case.

Figure 21:
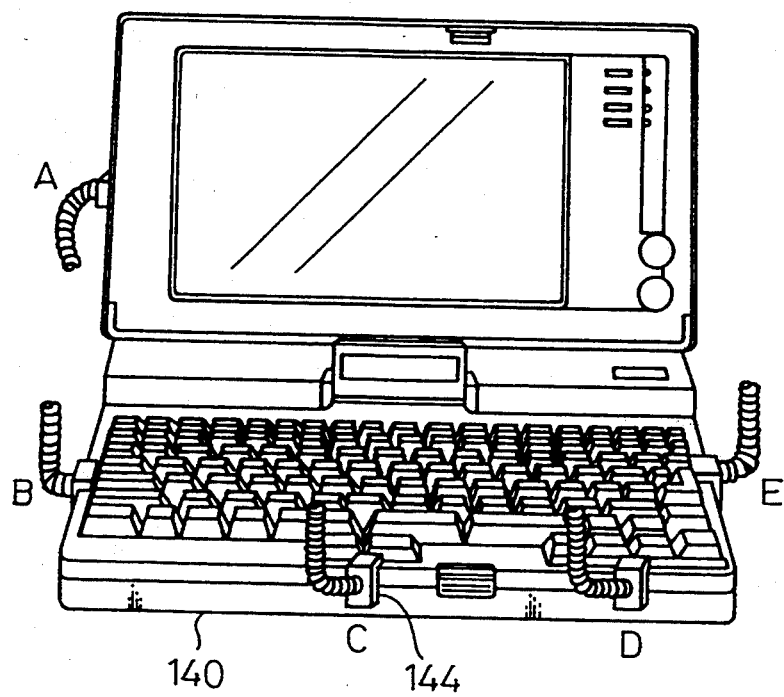
FIG. 21 is a view for explaining the state of the support arm fixed to a portable computer in the seventh embodiment of the present invention.

FIG. 21 is a view for explaining the state of the support arm fixed to a portable computer in the seventh embodiment of the present invention.

The computer connection portion 144 may be attached to any position of the housing of the portable computer 140. The operator can affix it to any position A to E etc. according to the present embodiment, since due to individual differences, the position of greatest ease of use differs—being the left side of the computer, the right side, the front, or the rear. Therefore, the operability becomes the best possible.

Further, the operator sets his fingers on certain keys so as to input data by blind touch, so this is convenient for operators as they can perform the pointing operation with the fingers kept on certain keys. Due to individual differences in the thickness of fingers, adeptness, etc., the position for setting the pointing device differs with the individual.

Figure 22:
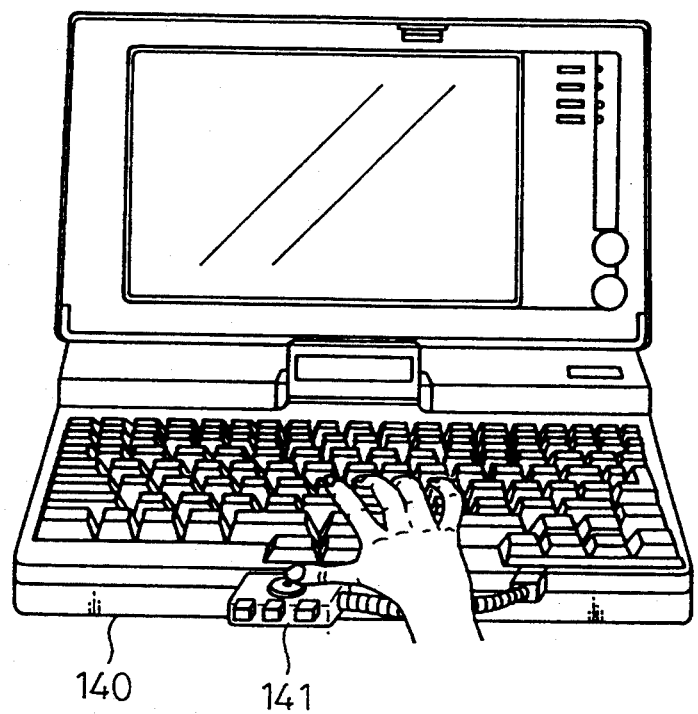
FIG. 22 is a view showing the state of operation of the seventh embodiment of the present invention attached to the front of a portable computer.

FIG. 22 is a view showing the state of operation of the seventh embodiment of the present invention with the device body 141 attached to the front of a portable computer 140.

In the case shown in the figure, use is made of the right hand and, with the index finger placed on the "J" key of the home position, the slider can be operated by use of the thumb. The keytops may also be operated by the thumb of the right hand.

Figure 23A:
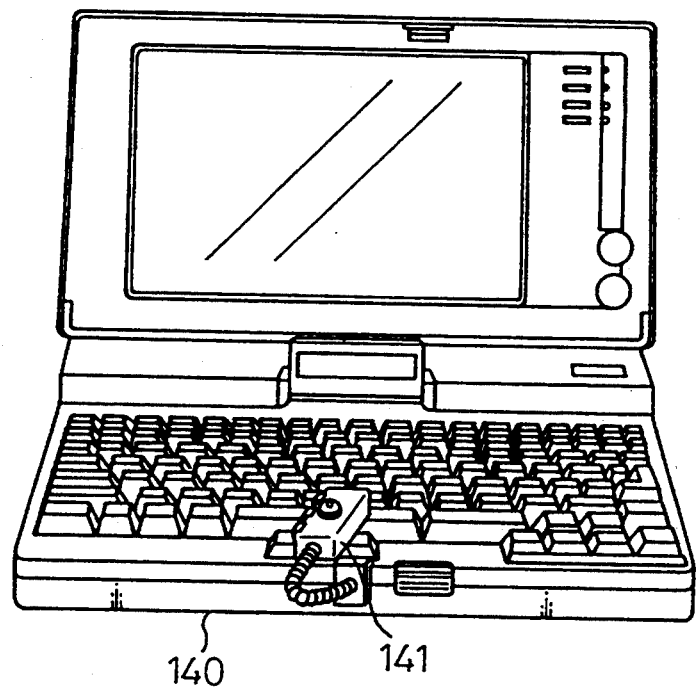
FIGS. 23A and 23B are views showing another example of the use of the seventh embodiment of the present invention.
Figure 23B:
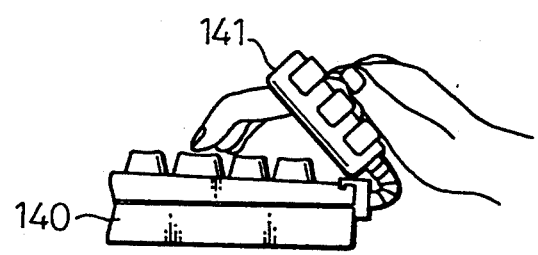

FIGS. 23A and 23B are an outside view and a partial side view of another example of the use of the seventh embodiment of the present invention.

The case shown in the figure is the case of the device body 141 set above the keyboard. This enables use with the minimal distance of movement of the fingers, enabling use by the operator without a sense of fatigue.

Figure 24:
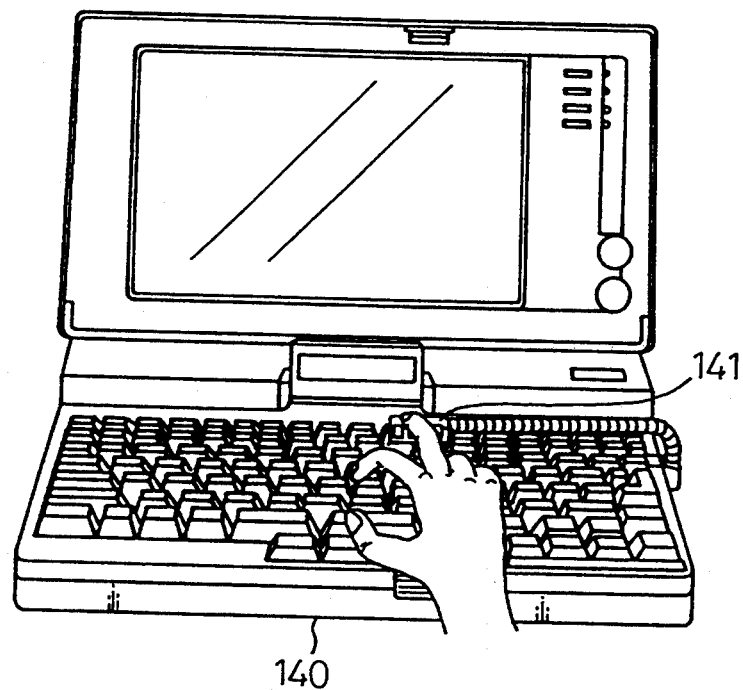
FIG. 24 is a view showing the case of setting the seventh embodiment of the present invention at the rear of the keyboard of a portable computer.

FIG. 24 is a view showing the case of setting the device body 141 of the seventh embodiment of the present invention at the rear of the keyboard of a portable computer 140.

For example, if set above the rear of the home position (J, K, L keys etc.), the slider can be operated using the index finger and middle finger, which are able to move adeptly.

Figure 25A:
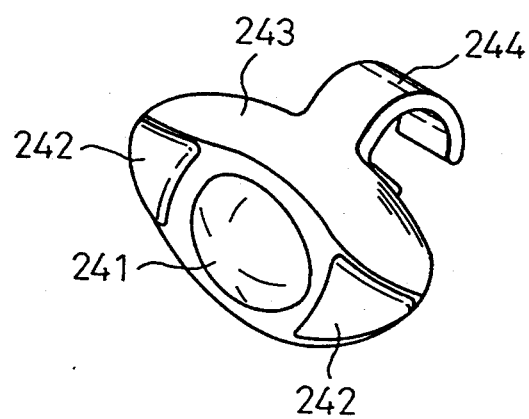
FIGS. 25A and 25B are an outside perspective view and a partial sectional view showing an eighth embodiment of the present invention.
Figure 25B:
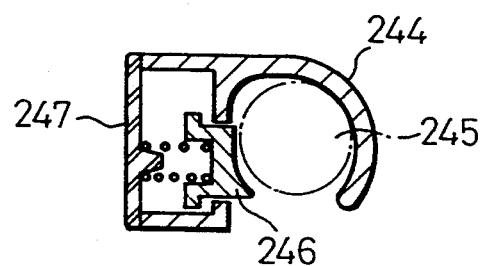

FIGS. 25A and 25B are an outside perspective view and a partial sectional view showing an eighth embodiment of the present invention.

In the figure, 241 is a slider, 242 are keytops, 243 is a case, 244 is a ring portion, 245 is a finger, 246 is a stopper, and 247 is a spring.

In the embodiment, as shown in FIG. 25A, the slider 241 is disposed at the center of the egg-shaped case 243 and keytops are disposed at the two sides of the same. Further, the ring portion 244 is provided at the side opposite to the slider 241. As shown in FIG. 25B, there are provided a stopper for fixing the position of a finger 245 when the finger 245 is inserted into the ring portion 244 and a spring 247 for biasing so as to press the stopper against the finger. Note that the internal construction of the case 243 is the same as in the seventh embodiment.

Figure 26:
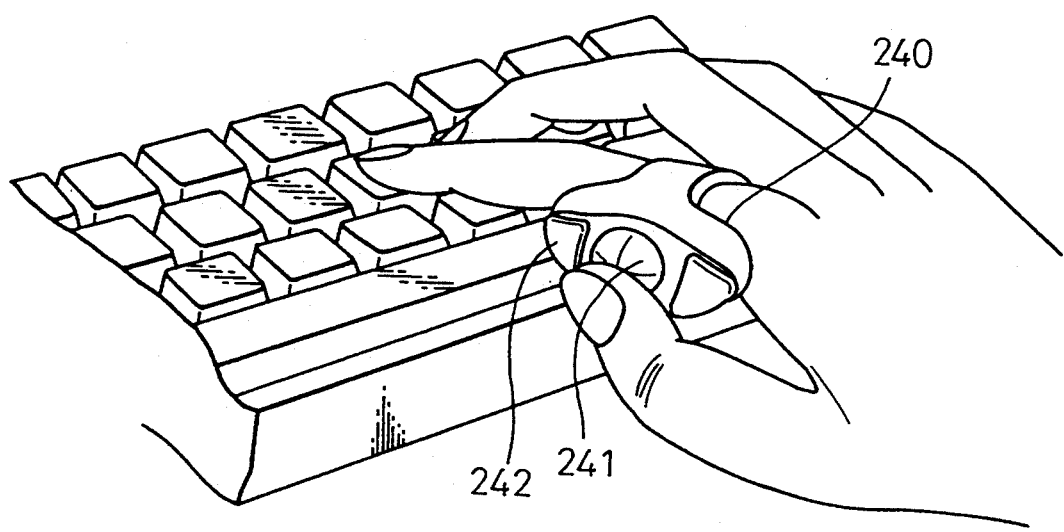
FIG. 26 is a view showing the state at the time of actual use of the eighth embodiment of the present invention.

FIG. 26 is a view showing the state at the time of actual use of the eighth embodiment of the present invention.

In the embodiment, as shown in the figure, the device body 240 is worn on the index finger 245. The thumb may be used to operate the slider 241 and the keytop 242.

Figure 27:
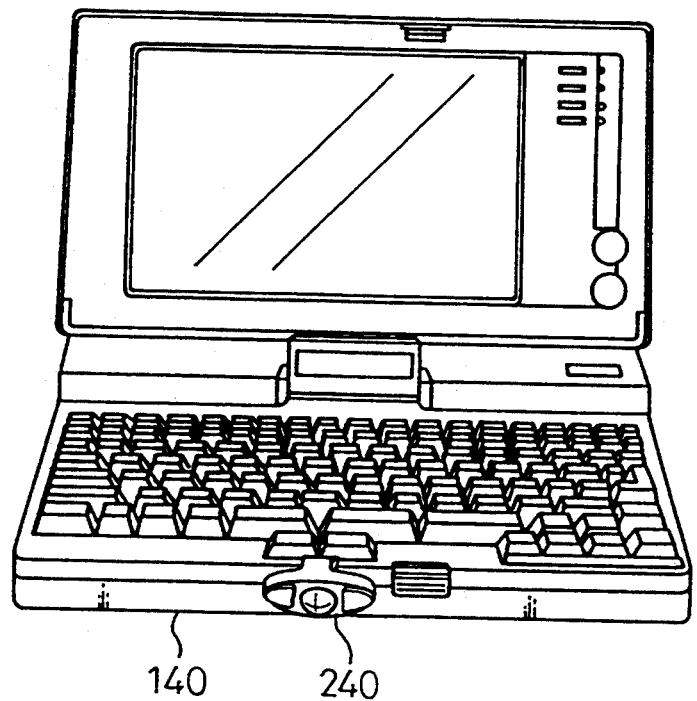
FIG. 27 is a view showing another state of use of the eighth embodiment of the present invention.

FIG. 27 is a view showing another state of use of the eighth embodiment of the present invention.

In the embodiment, as shown in the figure, the device may be used mounted to the housing portion of a portable computer 140.

Figure 28:
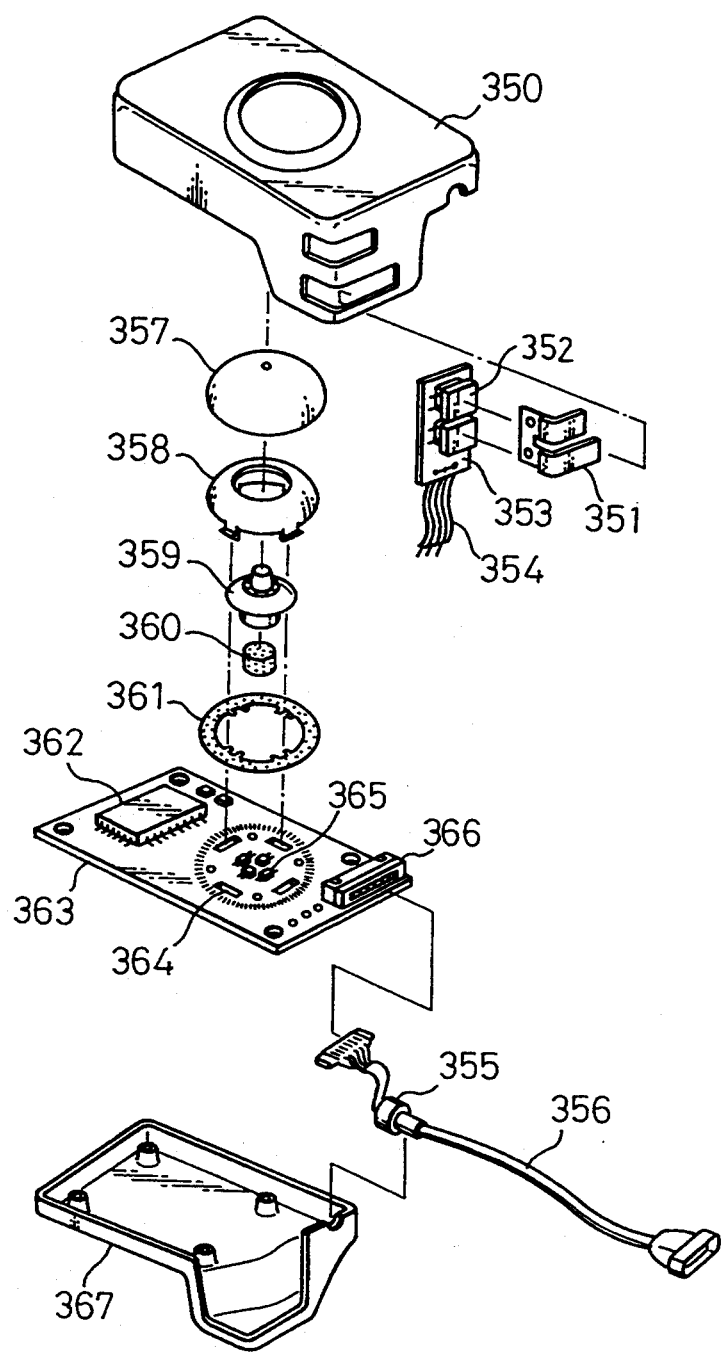
FIG. 28 is a disassembled perspective view showing a ninth embodiment of the present invention.
Figure 29:
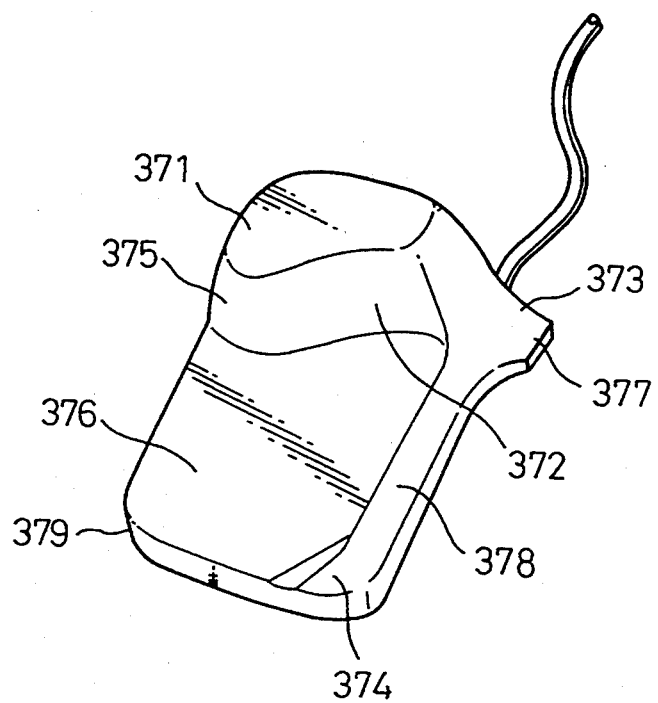
FIG. 29 is a view of the ninth embodiment of the present invention seen from the bottom.
Figure 30:
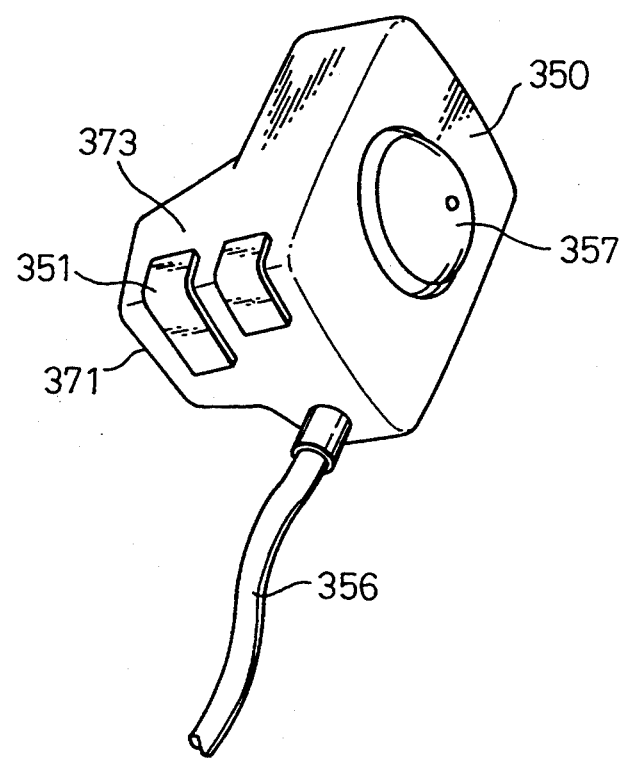
FIG. 30 is a view of the ninth embodiment of the present invention seen from the front top.

FIG. 28, FIG. 29, and FIG. 30 are views showing the ninth embodiment of the present invention, wherein FIG. 28 is a disassembled perspective view and FIG. 29 and FIG. 30 are outer perspective views.

In FIG. 28, 350 is an upper case and 367 is a lower case. The lower case 367 has a printed circuit board 363 attached to it, which printed circuit board 363 is equipped with a magnetoelectric conversion element 365, a connector 366, and a control circuit, i.e., MPU 362. The slider 357 is affixed inserted into the holder 359 so as to sandwich in the housing 358. The holder 359 has a permanent magnet 360 attached to it.

Further, the housing 358 is fitted into the housing mounting hole portion 364 formed in the printed circuit board 363 so as to be affixed. At the outer circumference of the housing 358 is mounted a pressure sensor 361.

On the other hand, the printed circuit board 353 equipped with the button switches 352 has keytops 351 attached to it and is connected to the printed circuit board 363 by the flat cable 354. The cable 356 is for connection with the computer body. The cable 356 has attached to it a magnetic coil 355 for preventing noise. This is engaged with the connector 366 equipped with the printed circuit board 363.

FIG. 29 is a view of the ninth embodiment of the present invention seen from the bottom.

As shown in the figure, at the front of the lower case 376 there is provided a projection 371. The projection 371, when seen from the bottom, has a wide left side width and becomes narrower the further to the right. The side surface 375 of the projection 271 has a depression 372 formed at the right side. Further, the right side surface of the lower case 367 has a projection 371 and a slanted surface 373 formed at the right. Further, small projections 374 and 377 are provided.

FIG. 30 is a view of the ninth embodiment of the present invention seen from the front top.

As shown in the figure, the slider 357 is disposed at the upper case 350. Keytops 351 are provided at the corner portion of the projection 371. The cable 356 is provided at the side opposite to the side with the keytops at the front side of the device.

Figure 31:
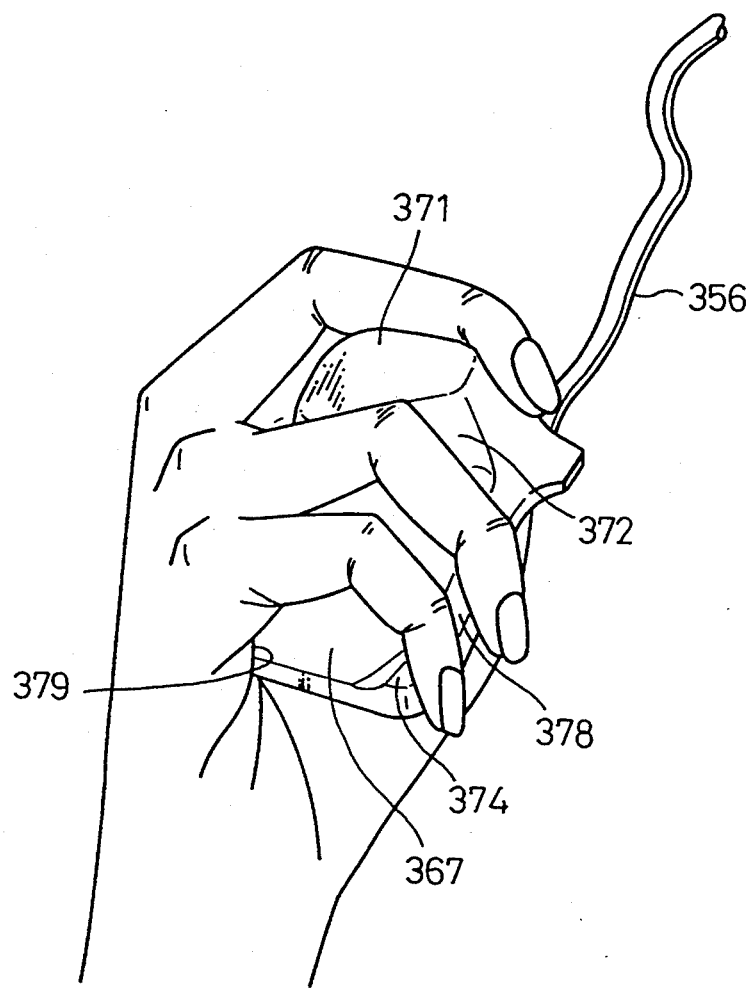
FIG. 31 is a view of the state of use of the ninth embodiment of the present invention seen from the bottom side.
Figure 32:
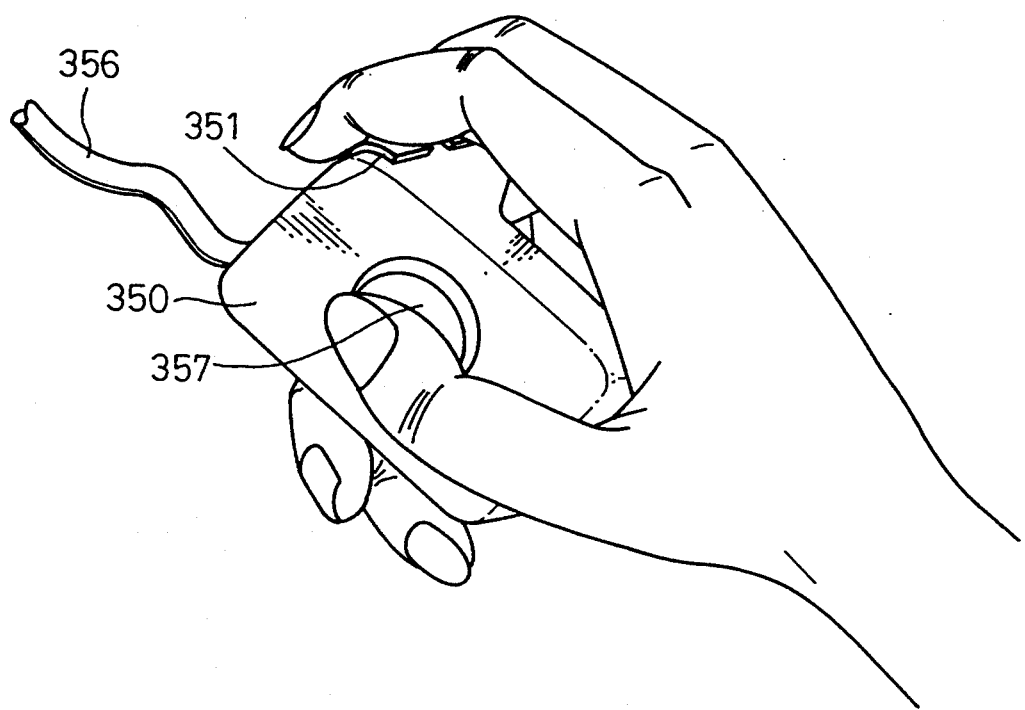
FIG. 32 is a view of the state of use of the ninth embodiment of the present invention seen from the upper case.
Figure 33:
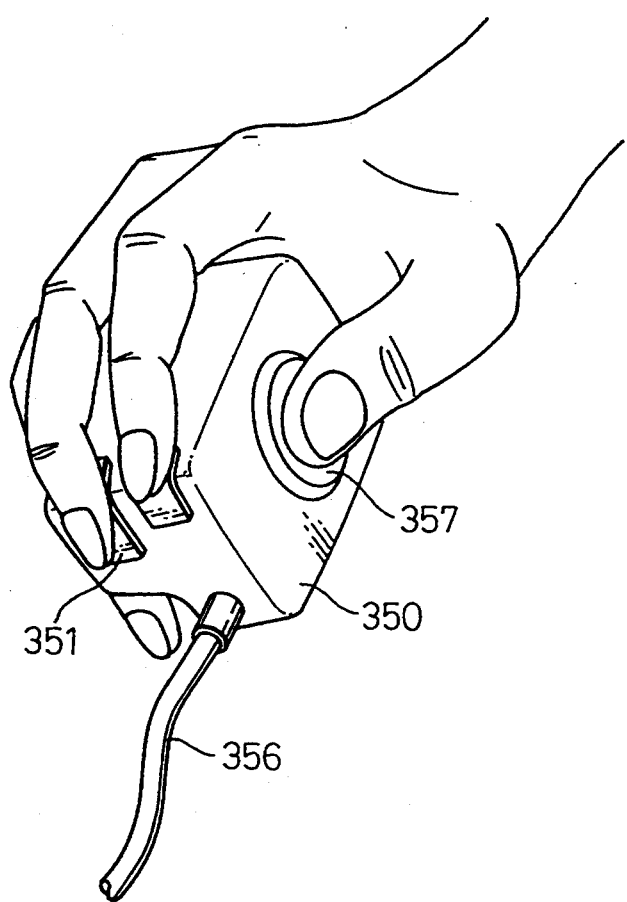
FIG. 33 is a view of the state of use of the ninth embodiment of the present invention seen from the front top.

FIG. 31, FIG. 32, and FIG. 33 are views showing the state of use of the ninth embodiment of the present invention. FIG. 31 is a view seen from the bottom, FIG. 32 is a view seen from the upper case, and FIG. 33 is a view seen from the front top.

To operate the embodiment by the right hand, as shown in FIG. 31, the ring finger and the pinky are used to firmly hold the lower case 367. That is, the part of the ring finger up to the first joint comes into contact with the side surface 375 of the projection 371, the first joint portion comes into contact with the depression 372, and the second joint comes into contact with the lower case side surface 378. The pinky lightly grips the device, with the portion from the second joint on coming into contact with the small projection 374. The depression in the palm of the hand comes into contact with the corner portion 379 of the device, enabling the device to be securely held.

Further, as shown in FIG. 32 and FIG. 33, when the slider 357 is operated by the thumb, the index finger and middle finger naturally contact the keytops 351 provided on the projection 373. Note that the slider 357 is operated by the thumb because the thumb can operate the slider more stably than the index finger. Further, the keytops 351 may be operated by the index finger and middle finger or the two keytops may be operated by the index finger alone. The keytops are disposed so as to facilitate operation by either finger since due to individual differences there are operators who are better with their index fingers. Further, the cable 356 is provided at the front side surface so as not to be hit by the finger during slider 357 operation.

The embodiment constituted in this way enables the device to be held using the fingertips regardless of the length or thickness of the fingers and enables use without discomfort though small in size.

Figure 34:
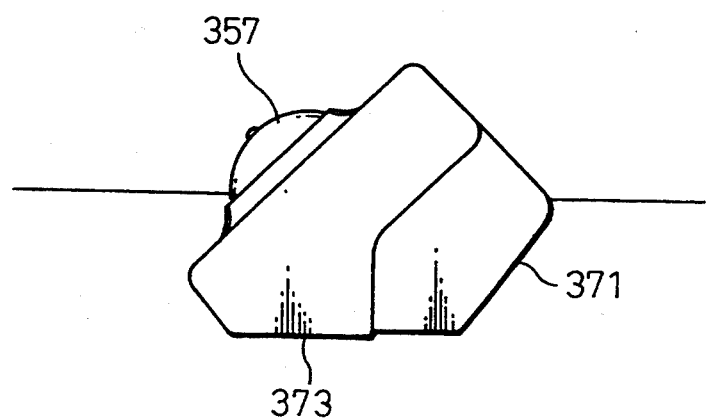
FIG. 34 is a view of the ninth embodiment of the present invention placed on a table seen from the rear side surface.

FIG. 34 is a view of the ninth embodiment of the present invention placed on a table seen from the rear side surface.

In the embodiment, when the device is laid on a table with the projection 371 and the slanted surface 373 forming the side surface placed downward, the surface where the slider 357 is disposed is slanted with respect to the tabletop. Therefore, the operator places his thumb on the slider 357 by moving his hand naturally from the keyboard to the device and can grip the device by wrapping his fingers around it, so the operability is improved much more.

Figure 35:
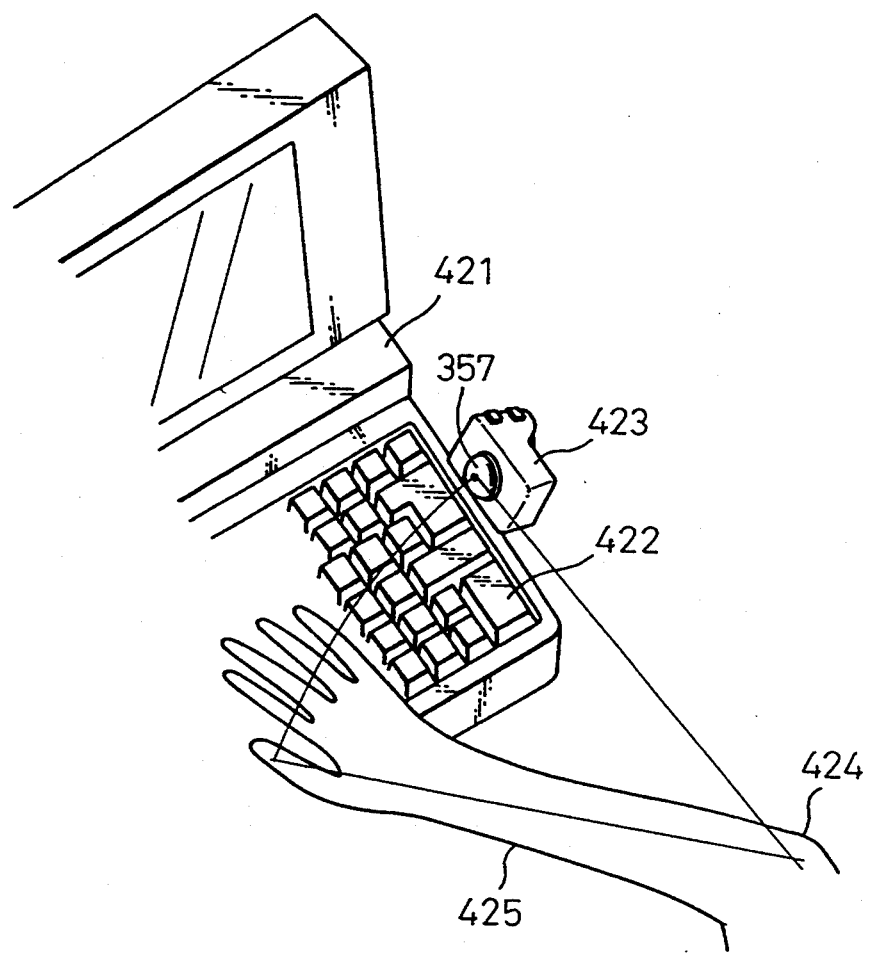
FIG. 35 is a view showing the state of mounting of the ninth embodiment of the present invention on a portable computer.

FIG. 35 is a view showing the state of mounting of a ninth embodiment of the present invention on a portable computer. In the figure, 421 is a portable computer and 422 is a keyboard portion of the portable computer. The device body 423 of the embodiment is mounted to the right side surface of the keyboard portion 422 of the portable computer 421. To enable smooth operation, the device is mounted at a position so that when the operator turns his arm 425 about his elbow 424 from a home position (with his index finger on the J key, his middle finger on the K key, his thumb on the space bar, etc.), his thumb comes exactly upon the slider 357.

Figure 36:
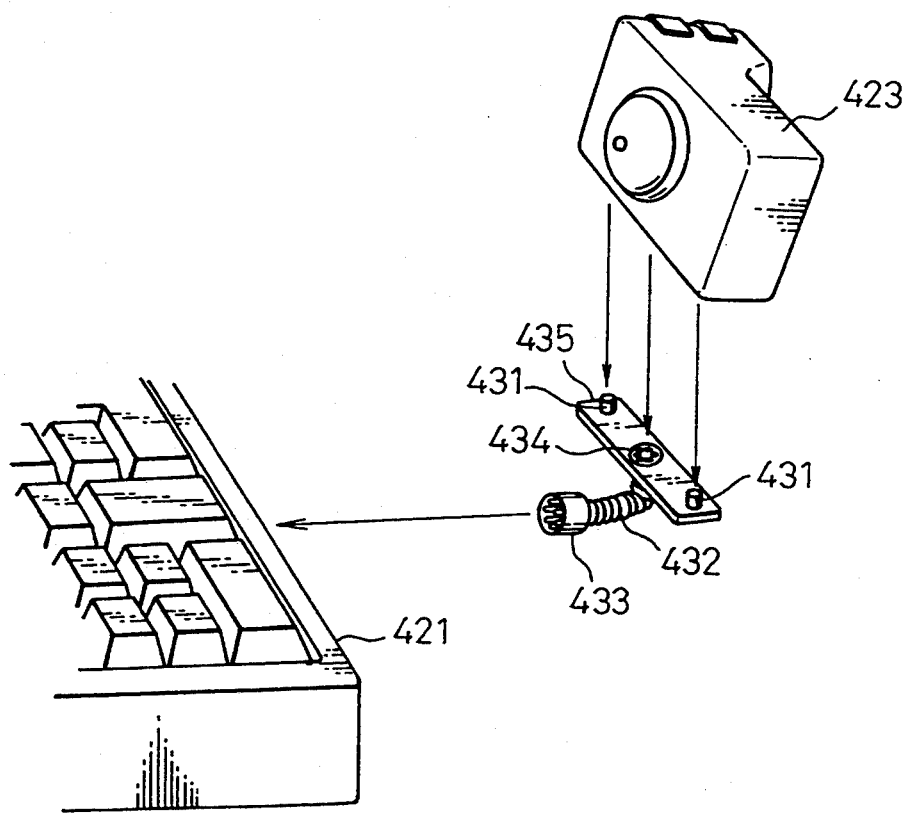
FIG. 36 is a view showing the method of mounting of the ninth embodiment of the present invention to a portable computer.

FIG. 36 is a view showing the method of mounting the ninth embodiment of the present invention to a portable computer.

In the figure, 435 is a mounting fitting, which mounting fitting 435 is provided with a mounting pin 431 and a connector portion 434. On the bottom surface is provided the support arm 432 which can be bent freely. Inside the support arm 432 is provided a cable for transmission of the pointing information. At the other end of the support arm 432 is provided a connector 433. The connector 433 is inserted into the connector of the portable computer 421 so as to mount the mounting fitting 435 to the portable computer 421. The device body 423 is provided with a hole engaging with the mounting pin 431 of the mounting fitting 435 and a latch mechanism (both not shown) and is affixed by the latch mechanism by engagement of the hole with the mounting pin 431. At the same time, the connector 434 is connected to the connector of the device body 423.

According to the sixth to ninth embodiments, it is possible to connect to an existing computer without modification of the computer and to provide the device as an optional part to the user. Further, the device does not take up operating space as with a mouse or track ball, is easy to operate, and can be attached to a computer, so is convenient to carry and move around, therefore contributes much to the expansion of the range of utilization of a pointing device.

The method of control of the present invention, including the above operation, will be explained next using FIGS. 37 to 39A and 39B. Further, the internal construction is explained using the third embodiment shown in FIG. 7 and 8 as an example, but the method can be applied to all of the embodiments.

Figure 37:
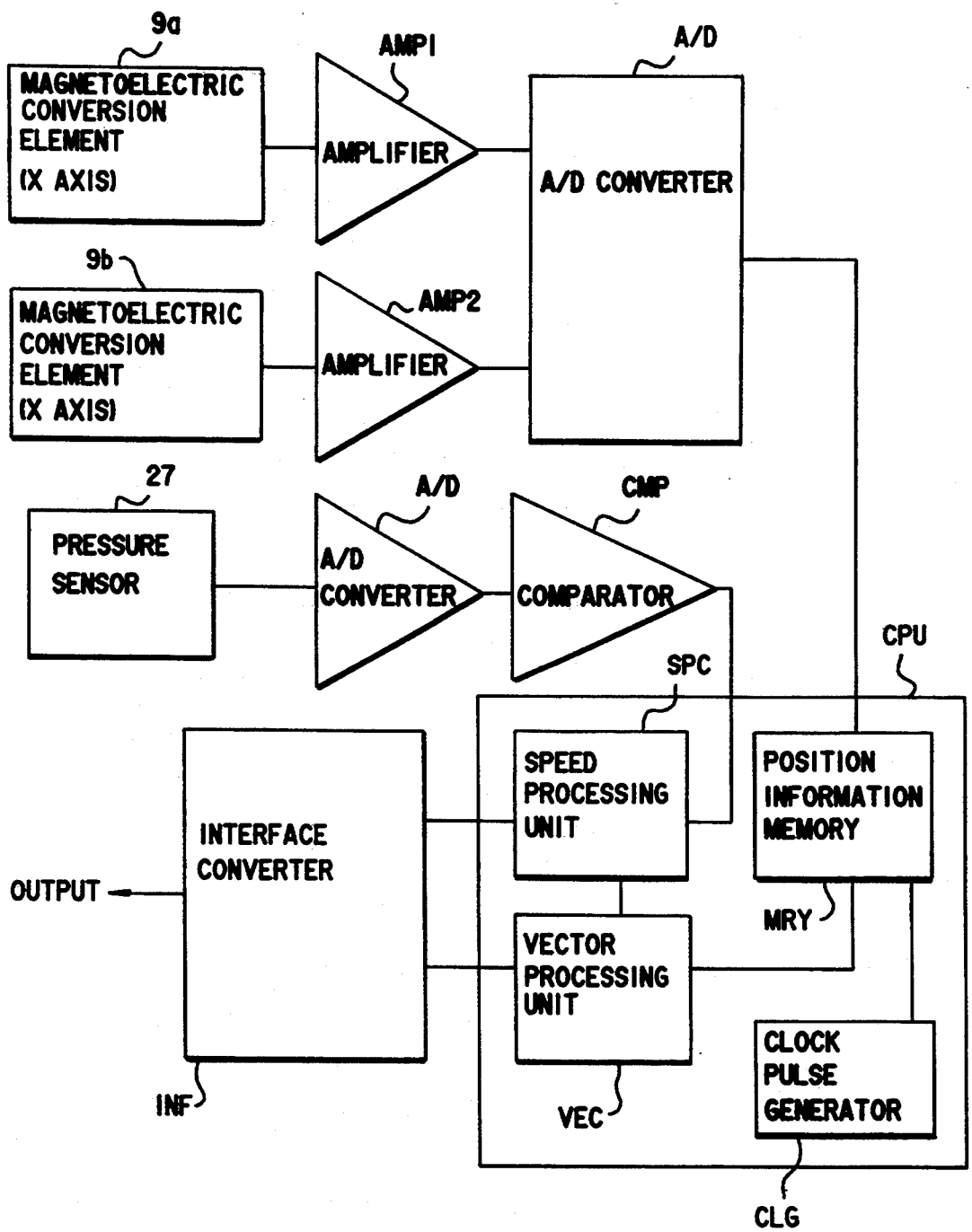
FIG. 37 is a block circuit diagram of the pointing device of the present invention.
Figure 38:
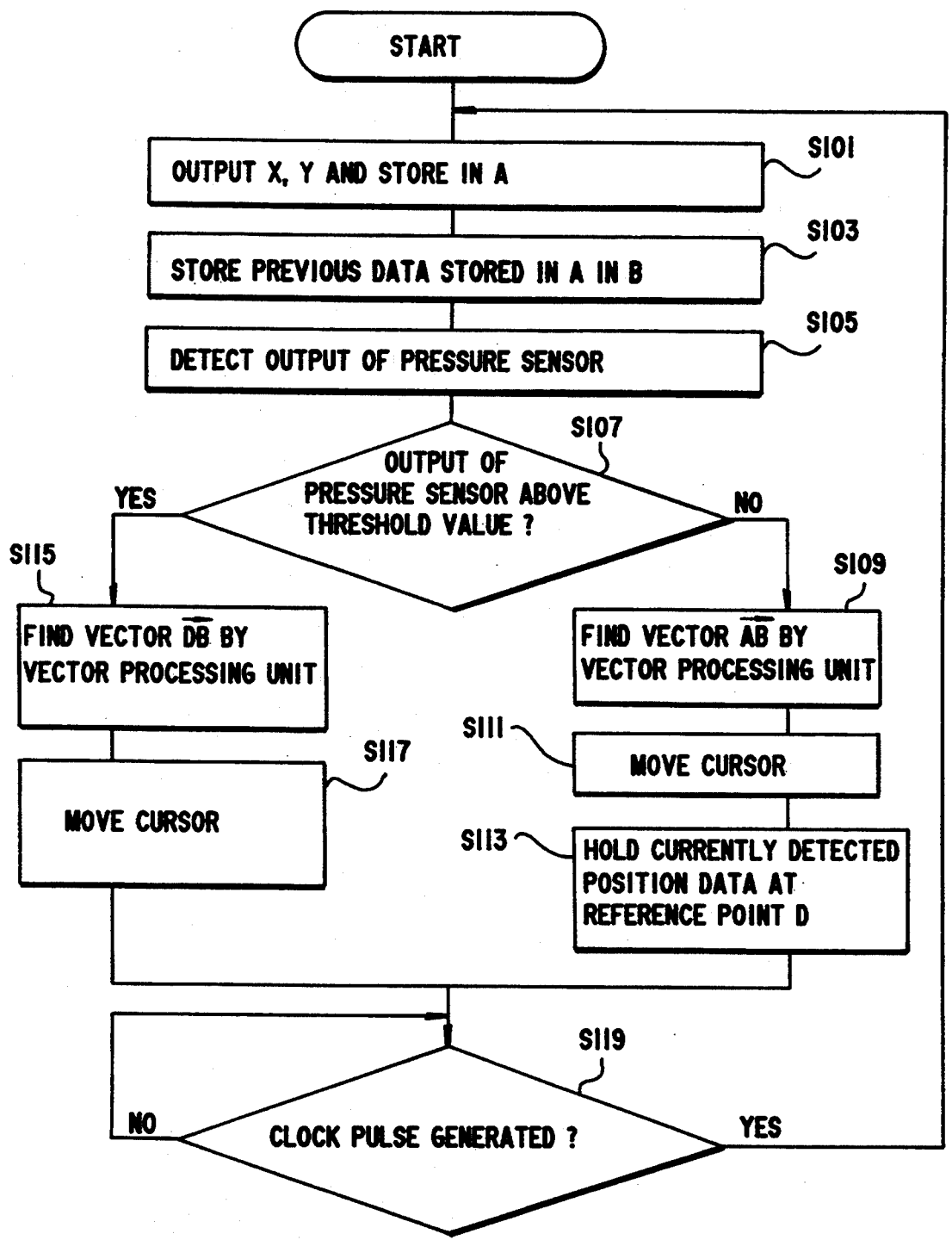
FIG. 38 is a flow chart of the speed control of cursor movement of the present invention.
Figure 39A:
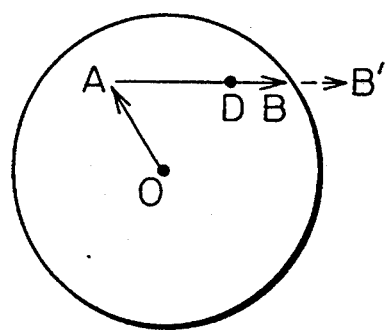
FIGS. 39A and 39B are views of the operating relationship of the slider of the pointing device according to the present invention and the cursor on the display.
Figure 39B:
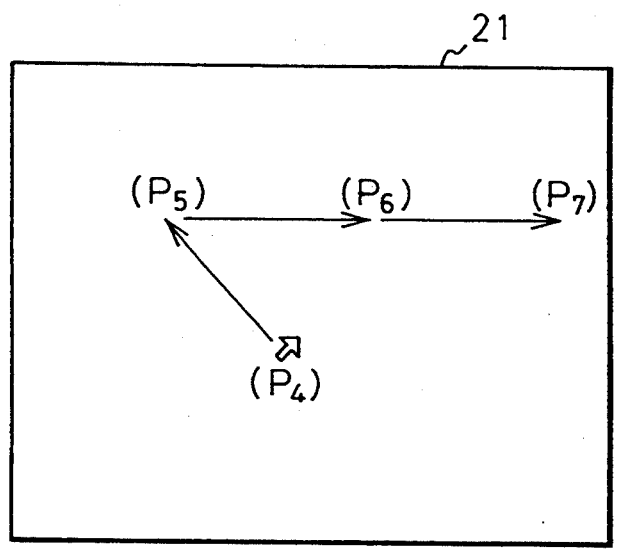

FIG. 37 is a block circuit diagram of a coordinate input device, FIG. 38 is a flow chart of the calculation processing performed by a computer in FIG. 37, and FIGS. 39A and 39B are a top view of a slider of the coordinate input device and a view showing a cursor on the display and for explaining the operation of the same.

The magnetoelectric conversion elements 9, as shown in FIG. 37, include one 9a which detects the position of the magnet 7 in the X-axial direction and one 9b which detects the position in the Y-axial direction. These are connected to the amplifiers AMP1 and AMP2, respectively.

For example, as shown in FIG. 39A, assume that the slider 1 is not slanted at all, the center of the slider 1 is at the position of the center O of the circle, and the cursor on the display 21 is positioned at (P4) (FIG. 39B). If the device is operated from this state so as to move the center of the slider 1 to A, the magnetoelectric conversion elements 9a and 9b successively detect the positions in the axial direction. The results of detection are taken out as analog signals, so the signals are input to an analog/digital converter A/D to be converted to digital signals. The signals from the analog/digital converter A/D are input to a position information memory MRY in the processor CPU. The position information memory MRY receives clock pulses from a clock pulse generator CLG and stores the position information from the analog/digital converter A/D in accordance with the timing of the pulses. That is, information on positions at predetermined timings in the movement of the slider 1 is stored in the position information memory MRY. Further, the number of pieces of information stored in the position information memory MRY is suitably set and when that number is exceeded the old information is erased.

The plurality of signals of the position information of predetermined timings obtained in this way are input to a vector processing unit VEC. The signals are computed so as to determine correspondence to cursor positions and are input to an interface converter INF for conversion to data which can be input to the computer unit (not shown) to which the display is connected.

As a result, as shown in FIG. 39B, the cursor moves to the position of ($P_5$).

In this way, in operations of a range where the slider 1 does not contact the pressure sensor 27, the cursor on the display 21 is moved to a position corresponding to the slant angle of the slider 1 in the same way as a conventional track ball etc.

Next, an explanation will be made of the case of moving the center of the slider 1 from A to B. The position of B is the position where the slider 1 starts to contact the pressure sensor 27.

When the center of the slider 1 moves to the position of B, a signal corresponding to the depression force is input from the pressure sensor 27 in FIG. 37 to a comparator CMP. The comparator CMP compares a predetermined amount of depression (threshold value) with the actually detection result and outputs a signal when the detection result is over the threshold value. This control is to prevent a signal output in the case where the pressure sensor 27 is accidentally lightly touched.

The signal from the comparator CMP is input to a speed processing unit SPC in the processor CPU. On the other hand, the position information from the magnetoelectric conversion elements 9a and 9b is stored in the memory MRY at timings based on the pulses of the clock pulse generator CLG as mentioned earlier. The preceding information of when the center of the slider 1 of FIG. 39A is the state B is the position of D.

Therefore, the processor CPU, as shown by the flow chart of FIG. 38, first makes the A/D converted value of the current X-axis and Y-axis magnetoelectric conversion elements 9a and 9b the coordinates A, makes the X- and Y-axis data which had been stored at A before the current data was input to A the coordinates B, and stores the same (steps S101 and S103).

Next, the output of the pressure sensor 27 is detected (step S105) and the A/D converted value is compared with a predetermined reference value (threshold value) at the comparator CMP (step S107). When the output of the sensor is less than the threshold value, the routine proceeds to step S109, where the vector AB is found by the vector processing unit VEC and the cursor is moved so as to correspond to the vector AB (steps S109 and S111). This corresponds to movement of the cursor from ($P_5$) to ($P_6$) in FIG. 39B in response to movement of the slider from A to B in FIG. 39A. The data of B is copied to the reference point D (where D is the sampling point several times before) (step S113).

When the A/D converted value of the pressure sensor 27 is the threshold value or more, the vector DB is found by the vector processing unit VEC and the cursor is moved with the direction of movement of the cursor made the direction of the vector DB and with the amount of cursor movement made an amount calculated by a speed processing unit SPC by the output of the pressure sensor 27 (steps S115 and S117).

This corresponds to movement of the cursor from ($P_6$) to ($P_7$) in FIG. 39B in response to movement from D to B in FIG. 39A. Further, when the pressure sensor is pressed at the point B, D becomes the reference point. The reference point is not changed until the pressure on the pressure sensor ends.

The above operation is repeated each time a clock pulse is output at predetermined timings from the clock generator CLG (step S119).

By the above control, the operation of the slider 1 at the time of speed control and the direction of movement of the cursor on the display 21 match, so the operability becomes better.

Figure 40A:
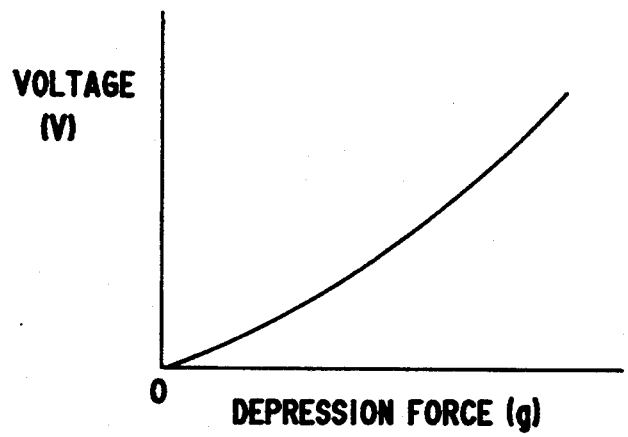
FIGS. 40A and 40B are views showing the relationship between the output voltage of a pressure sensor with respect to the force of depression of a pressure sensitive rubber switch and the speed of movement of the cursor.
Figure 40B:
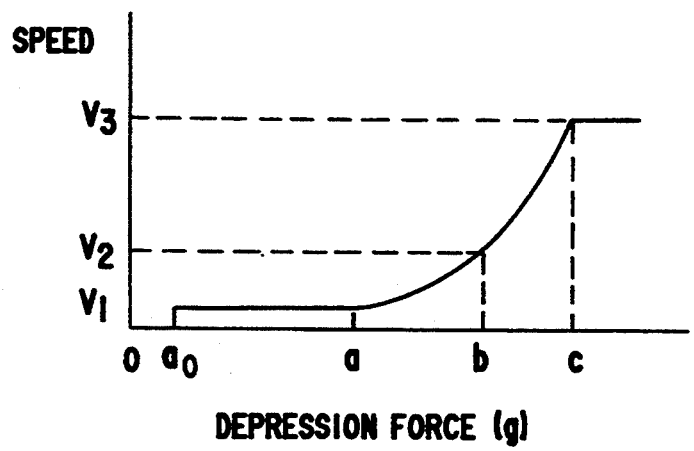

FIGS. 40A and 40B are view showing the relationship of the output voltages of the electrodes 28 and 28' in response to the force of depression of the pressure sensitive rubber switch 27 and the speed of movement of the cursor.

As shown in FIG. 40A, the output voltage rises in proportion to the force of depression of the pressure sensitive rubber switch 27. The force by which the pressure sensitive rubber switch 27 is depressed and the adjustment of the same usually differ depending on the operator. Therefore, as shown in FIG. 40B, the speed is made a constant speed $V_1$ until a predetermined depression force a is reached, becomes a speed $V_2$ at a gentle acceleration when it passes this until it becomes a depression force b, becomes a speed $V_3$ at a large acceleration after it passes this until it reaches a depression force c, and then is set to a constant speed. Further, the region until $a_0$ is reached is made an insensitive region so as to prevent mistaken operation when the pressure sensor is depressed inadvertently or accidentally.

By performing speed control in this way, it is possible for all operators to operate the device without an uncomfortable feeling.

The above mentioned control of the present invention is not limited to the present embodiment and can also be applied to joysticks etc.

Therefore, according to the present invention, the cursor may be moved by supplying power to the Hall element for just the short time needed, so the power consumed can be minimized. Therefore, it is possible to extend the lifetime of the batteries powering the portable device.

Figure 42A:
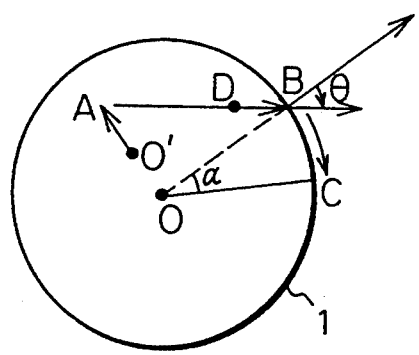
FIGS. 42A and 42B are views showing the operating relationship between the slider of the pointing device according to the present invention and the cursor on the display.
Figure 42B:
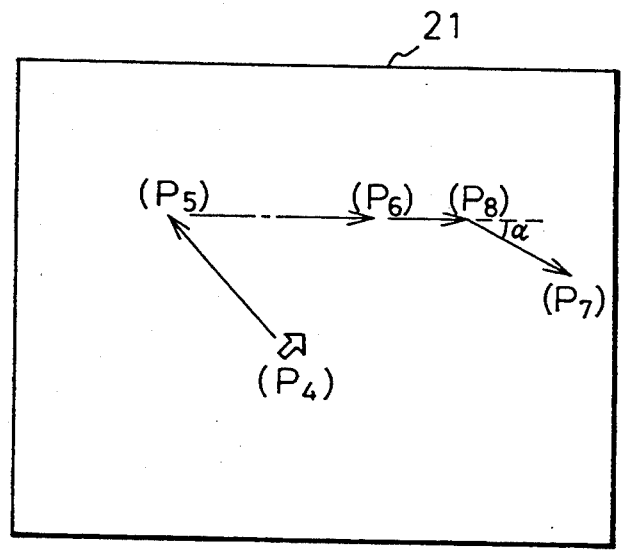

FIGS. 41, 42A, and 42B show another control method of the present invention. Basically, the key portions are the same as the control method shown in FIGS. 38, 39A, and 39B.

In accordance with the clock pulses from the clock pulse generator CLG, the output values of the A/D converter A/D of the X-axis and Y-axis magnetoelectric conversion elements 9a and 9b at that time and the outputs of the A/D converter A/D of the magnetoelectric conversion elements 9a and 9b of the previous time are stored in the memory MRY (step S201). Next, at step S203, the output of the pressure sensor 27 is counted. Next, at step S205, the A/D converted value of the output of the pressure sensor 27 and a predetermined reference value (threshold value) are compared and when the output value is not higher than the threshold value (below, the state when the output value is higher than the threshold value will be referred to as the ON state and the state when it is below the threshold value the OFF state), the routine proceeds to step S205, where the current X- Y-axis output values (point A in FIG. 42A) and the previous X- and Y-axis output values (point O' in FIG. 42A) are used to find the vector O'A at the vector processing unit and move the cursor so as to correspond to the vector O'A (corresponding to movement of the cursor position from (P₄) to (P₅) in FIG. 42B.)

Next, at step S205, when the output value of the pressure sensor is larger than the threshold value (that is, the state is ON), the routine proceeds to step S211, where it is checked if the ON state is successive.

At step S211, if the state was not ON at the previous detection and is ON at the current detection, if the current X- and Y-axis output values are made the point B of FIG. 42B and the previous X- and Y-axis output values are made the point D, the vector component of the vector OB=(x,y) (where O is the center of the range of possible movement of the slider 1, that is, the center of the circle in FIG. 42A) and the vector component of the vector DB=(X', Y') are used to find $k\cos\theta = xX' + yY'$ and $k\sin = xY' - yX'$ (step S213). The cursor is moved using as the direction of movement of the cursor the direction of the vector DB and using as the amount of movement of the cursor the amount calculated at the speed processing unit SPC by the output of the pressure sensor 27 (step S215) (corresponding to movement of the cursor position from (P₆) to (P₈) at FIG. 42B).

When successively ON in state at step S211, if the current X- and Y-axis values at FIG. 42A are made the point C of FIG. 42A, the previous X and Y values are made the point B, and movement is performed from B to C while maintaining the ON state, if the $k\cos\theta$ and $k\sin\theta$ found at the first ON state are used for vector conversion of the vector OC=(x", y") ($X = x^*k\cos\theta - y^*k\sin\theta$, $Y = x^*k\sin\theta + y^*k\cos\theta$), the direction of the vector (X,Y) after conversion becomes one of the direction of the vector DB rotated by exactly $\angle BOC = \alpha$. The cursor is moved using as the direction of movement of the cursor the direction of the vector (X,Y) and using as the amount of movement of the cursor the amount calculated at the speed processing unit SPC by the output of the pressure sensor 27 (steps S217 and S219). This corresponds to movement of the cursor position from (P₈) to (P₇) at FIG. 42B.

The above operation is repeated each time a clock pulse is produced from the clock pulse generator CLG (step S221).

Figure 44A:
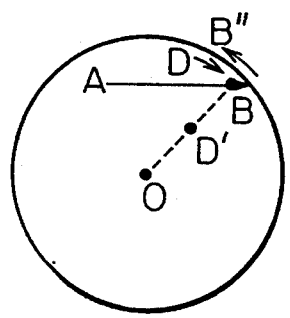
FIGS. 44A and 44B are views similar to FIGS. 42A and 42B for explaining other movement.
Figure 44B:
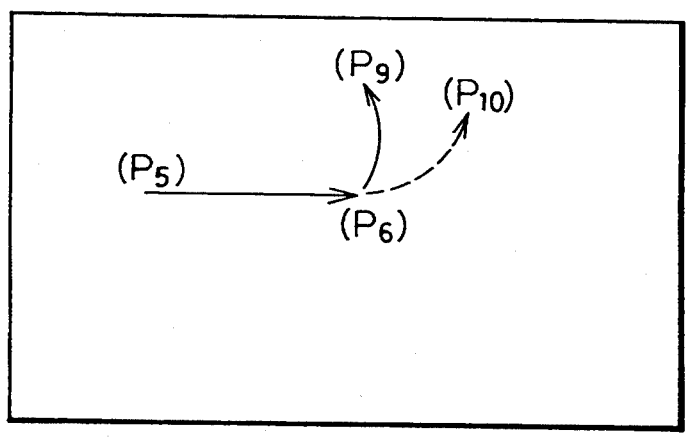

FIGS. 43, 44A, and 44B are views showing another method of control of the present invention. This embodiment is an improvement over the embodiment shown in FIGS. 38, 39A, and 39B. In FIGS. 39A and 39B, it is assumed that the center of the slider 1 is moved from point a to point B, the pressure sensor 27 is depressed at B, and it is continued to be depressed in the same direction (point B'). From A to immediately before B (before the pressure sensor 27 is depressed), the vector of AB (amount and direction of movement) is used to move the cursor from (P₅) to (P₆), in the same way as mentioned earlier, but the direction of movement of the cursor when the pressure sensor 27 is depressed at point B is the direction of the vector DB based on the position of D, which is the information immediately preceding B. Further, the amount of movement of the cursor is determined by the force of depression of the pressure sensor. If the pressure sensor continues to be depressed toward the point B', the position information of D is held as the reference point and the direction of the vector DB' of this reference point and the latest position (B') and the force of depression of the pressure sensor are used to move the cursor from (P₆) to (P₇).

Figure 45A:
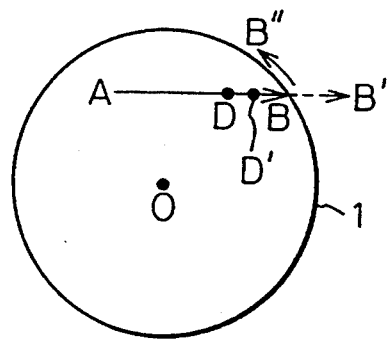
FIGS. 45A and 45B are views similar to FIGS. 44A and 44B for explaining still further movement.
Figure 45B:
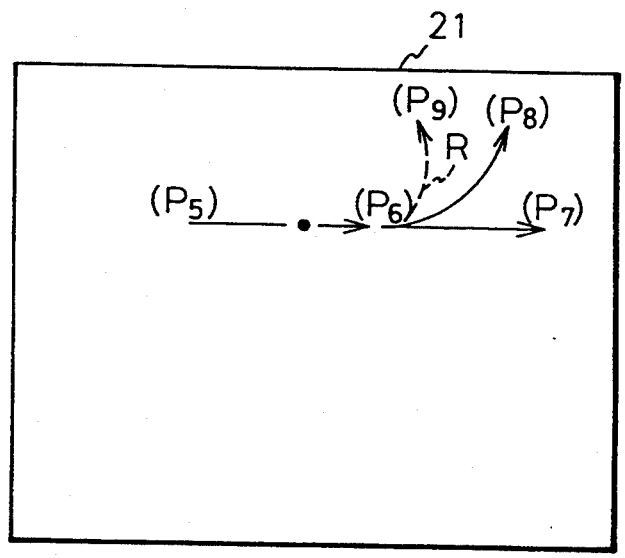

Next, as shown in FIGS. 45A and 45B, if envisioning the case of moving the slider 1 from A to B and moving it from B (position where slider 1 starts to contact pressure sensor) to B" while depressing the pressure sensor (that is, when turning toward the point B" while depressing the pressure sensor), the cursor moves from (P₅) to (P₆) and (P₈). Here, it should be noted that the direction of movement of the cursor at (P₈) is the vector DB". Therefore, if D is a position closer to B, as shown by D', even if the slider is moved as from A to B to B", the cursor will move from (P₅) to (P₆) to (P₉), in particular, the direction of movement of the cursor from (P₆) to (P₉) will change rapidly, and the operation of the slider will become difficult.

The direction of movement of the cursor changes rapidly in this way because the latest position information and the preceding position information reference point are close to each other when moving the slider while depressing the pressure sensor.

Therefore, in the embodiment shown in FIGS. 43, 44A, and 44B, when the latest position information and the reference point (immediately preceding position information) are close, the reference point is made further away so as to ease the rapid change of the direction of cursor movement when moving the slider while depressing the pressure sensor.

In FIG. 43, at steps S301 and S303, the outputs of the X-axis and Y-axis at the point B are detected and the output of the pressure sensor is detected.

The operation in the case where the output of the pressure sensor is smaller than a predetermined threshold value (steps S305, S307, S309, S311) is the same as in the previously mentioned embodiment (FIG. 38), so the explanation of the same will be omitted.

At step S313, it is checked if the current position B and the immediately preceding position D are closer by more than a predetermined distance.

Here, if B and D are separate from each by a certain distance (threshold value), exactly the same processing is performed as in the past (FIG. 38) (steps S315 and S317). The present embodiment relates to processing in the case where the distance between B and D is less than a predetermined threshold value. That is, at step S313, when the distance between B and D is less than a certain threshold value, the routine proceeds to step S319, where the reference point is changed from D to D' and the direction of movement of the cursor is computed based on the direction of the vector D'B and the amount of movement of the cursor by the detection value of the pressure sensor (step S321). The point D' is suitably determined by design. For example, it is made the intermediate point D'=(D−O)/2 between D and the dome center O. (If the distance between B and D is above a certain threshold value, the reference point remains D.)

As a result, the cursor is moved in the direction of the vector D'B by exactly the amount of movement determined by the force of depression on the pressure sensor (step S323).

Therefore, when the pressure sensor is depressed and the cursor is moved from B to B", if the distance between the newest position and the reference point D is less than a certain threshold value, the reference point is changed from D to D', whereby the direction of movement of the cursor does not change rapidly from (P$_6$) to (P$_9$), but changes gently from (P$_6$) to (P$_{10}$).

Figure 46:
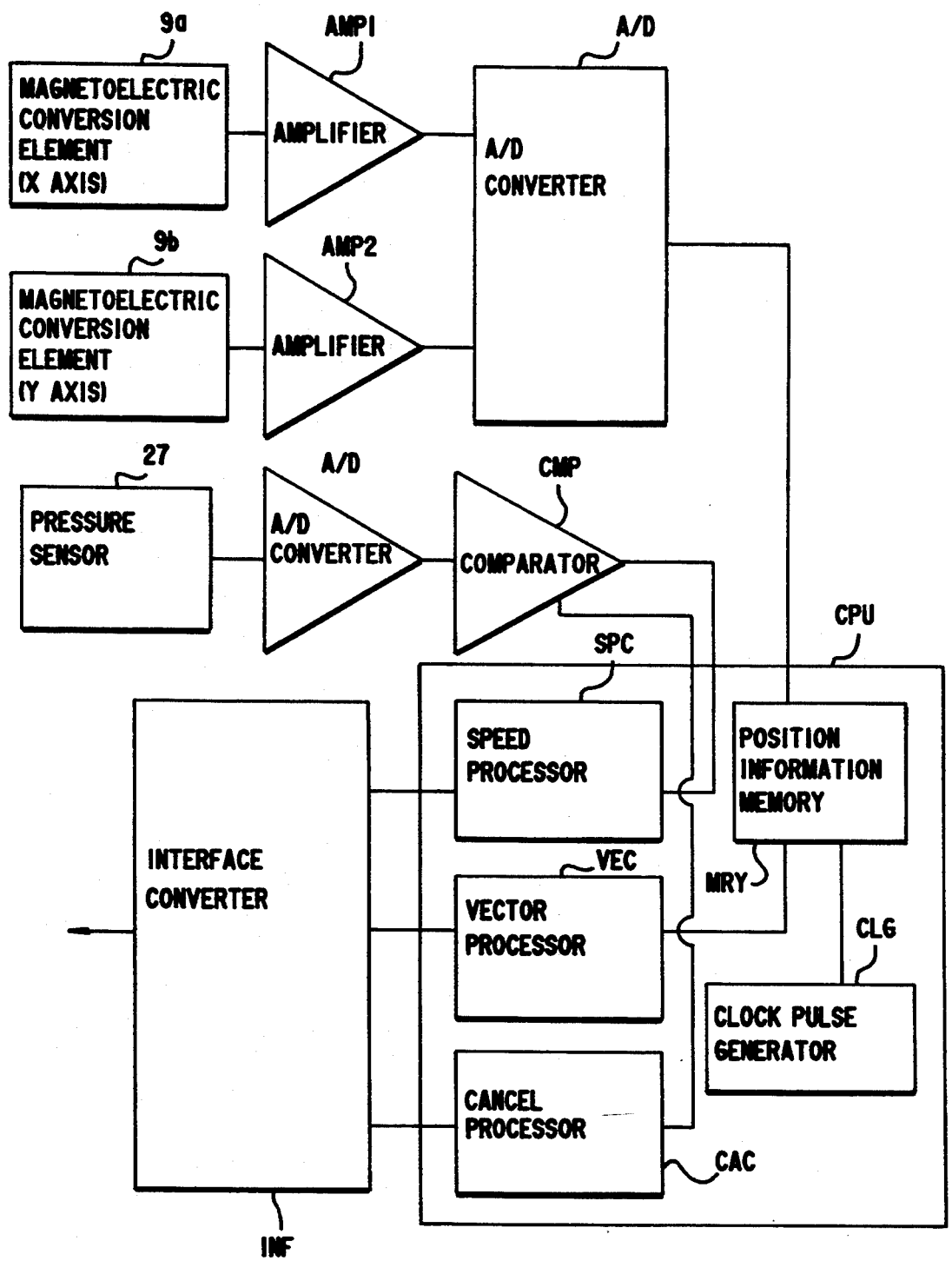
FIG. 46 is a block diagram of another embodiment than FIG. 37.
Figure 47:
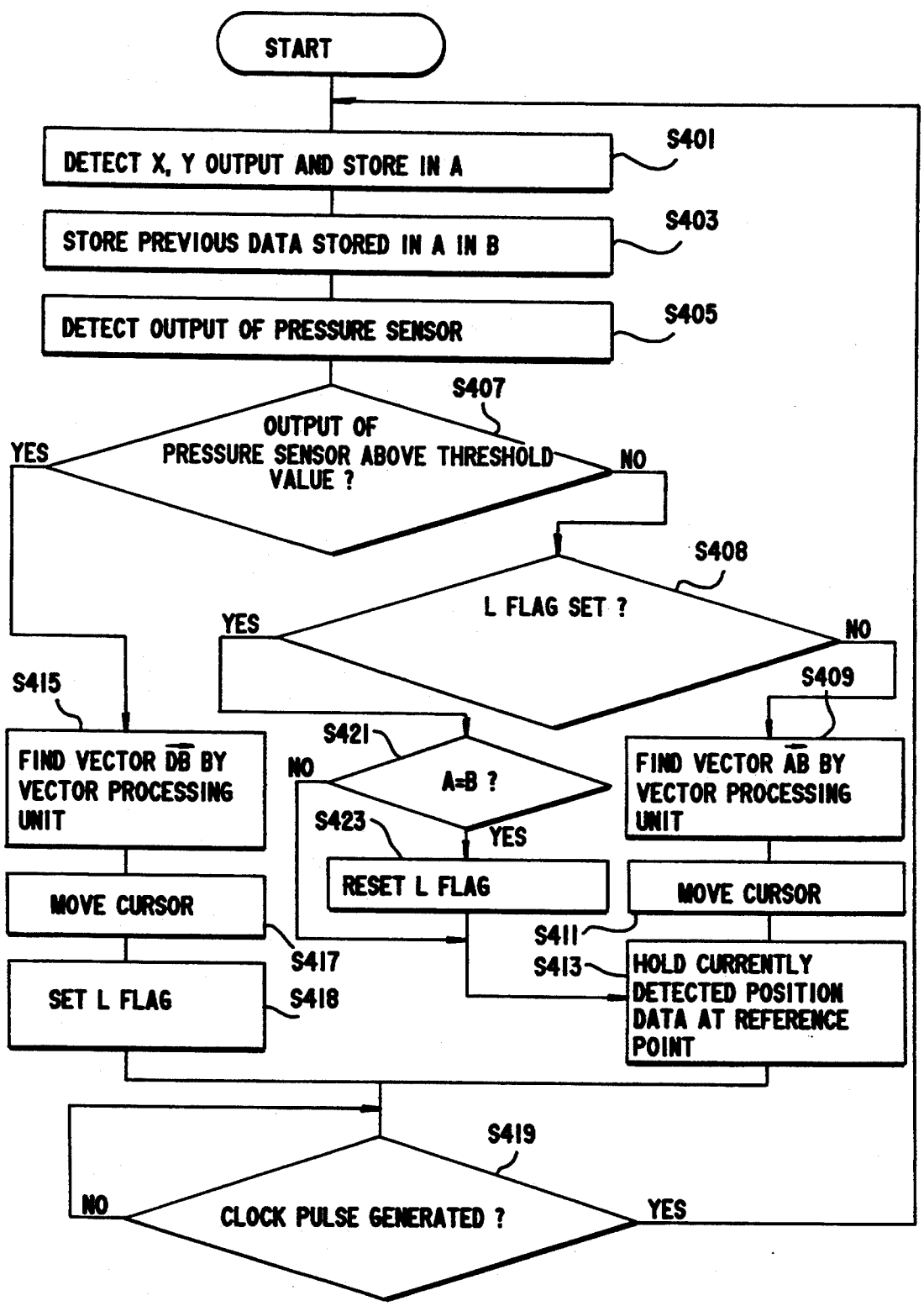
FIG. 47 is a flow chart of still another embodiment of the present invention.

FIGS. 46 and 47 show further embodiments of the present invention.

As mentioned above, according to one embodiment of the present invention, positional control is performed until the slider contacts a pressure sensor, then when the slider further depresses the pressure sensor (however, no insensitive region is considered here), speed control is shifted to. In this case, when the operator moves the cursor in the speed control region, he stops depressing the slider at the position where the target position is reached, but at this time may move the slider slightly in the reverse direction and enter the positional control region, whereupon the cursor will end up moving in the opposite direction. Therefore, it would be better if the cursor were made not to move even if the positional control region were mistakenly returned to after speed control ended.

Figure 48:
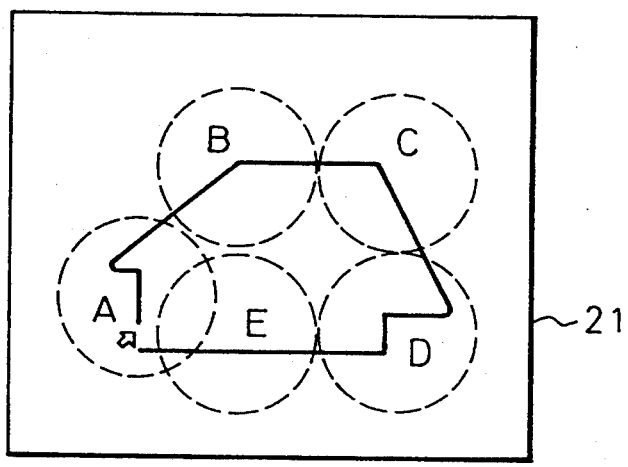
FIG. 48 is a view for explaining the screen on the display in the case of drawing a figure using the pointing device of the present invention.
Figure 49A:
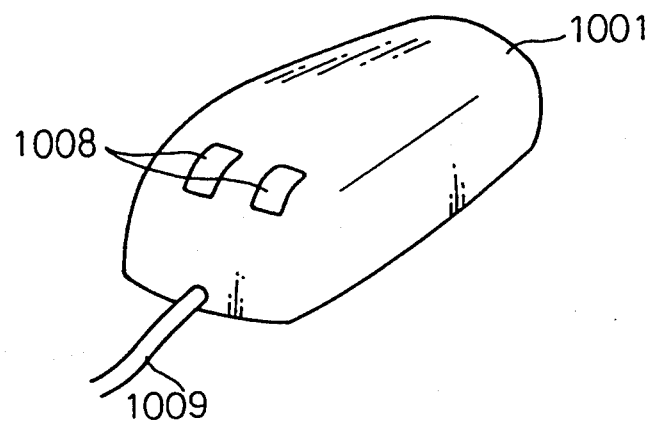
FIGS. 49A and 49B are a perspective view and longitudinal sectional view of an example of a conventional mouse.
Figure 49B:
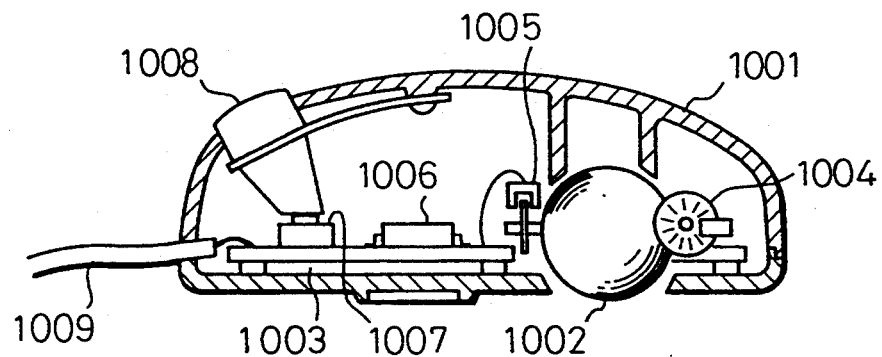
Figure 50:
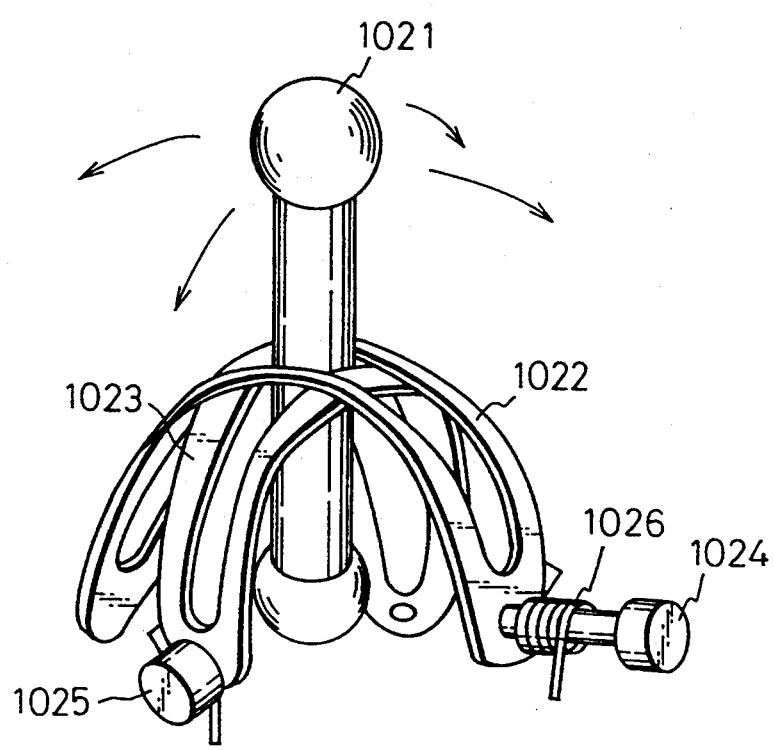
FIG. 50 is a perspective view of a conventional joystick.
Figure 51A:
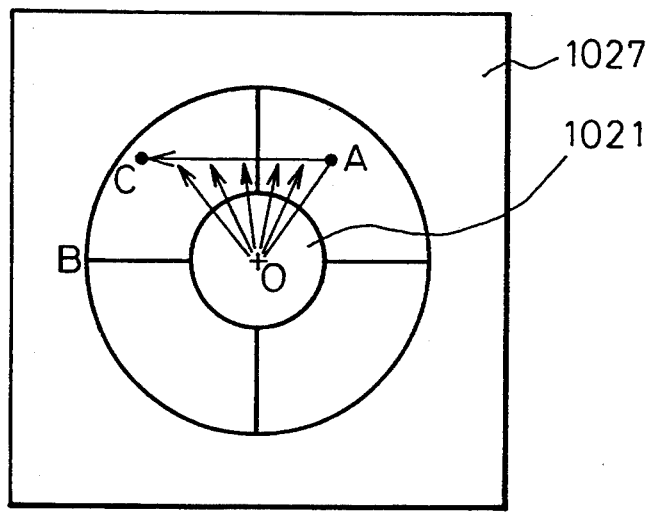
FIGS. 51A and 51B are view showing the operating relationship of a joystick and cursor in the prior art.
Figure 51B:
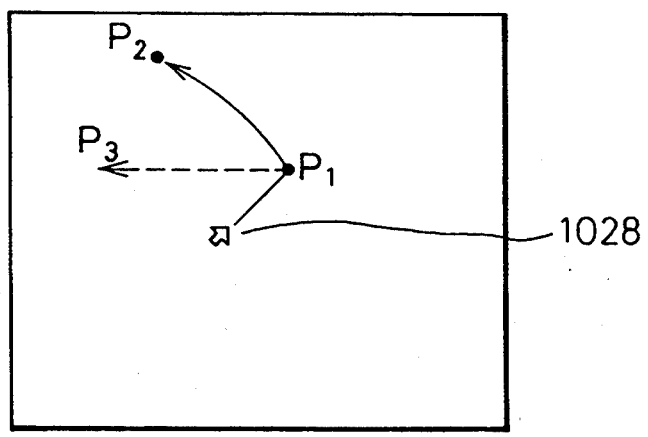

Further, as shown in FIG. 48, when drawing a figure filling the display screen 21, it would be convenient if the cursor could be moved by positional control in the screen as a whole. That is, as shown in FIG. 48, in general, the screen is divided into a plurality of regions A, B, C, D, and E (reduced) and the figure is completed successively in each of those regions. This is because, in the case of a graphic, as opposed to text, there is generally a need to draw fine lines, so for example, so this is for reducing the region (positional control region) where the cursor moves relatively much in response to a slight movement of a mouse, for example. At this time, when for example drawing the region of A, when the boundary (edge) of A is passed, the speed region is entered and a change of force is required at the region, so the actual drawing operation becomes difficult.

An embodiment for solving this is shown in FIGS. 46 and 47.

In the flow chart of FIG. 47, steps S401, S402 . . . correspond to steps S101, S103 . . . in the flow chart of FIG. 38 and therefore an explanation of the same will be omitted. That is, the steps expressed by the same numbers except at the 100 decimal place show the same operations in FIG. 47 and FIG. 38.

The steps unique to FIG. 47 are S408, S418, S421, and S423. When drawing a figure at, for example, the positional control region A and inadvertently entering the speed control region, the output of the pressure sensor may be considered to fall below the above threshold value. When the output value of the pressure sensor is above a certain threshold value at step S407, completely the same processing steps S415 and S417 as in the past (FIG. 38) are performed, then the L flag is set at step S418. On the other hand, when the output of the pressure sensor is below the threshold value at step S407, the routine proceeds to step S408, where it is detected if the L flag is set. At the time of the start of the L flag program, further, the flag is in the reset state. When set, the cursor is held in a stopped state. That is, when the L flag is set, the movement of the cursor is canceled. When the L flag is not set at step S408, normal cursor movement (positional control) is possible and the routine proceeds to step S409.

When the L flag is set at step S408, the cursor does not move, so even if one returns from the speed control region to the positional control region, the cursor will not move so long as the L flag is not reset.

The L flag is reset only when the slider is stopped. The stopping of the slider corresponds to the time when the two successively detected X and Y axial output values, that is, the values of the data A and B at steps S401 and S403, become equal. Therefore, only when A equals B at step S421 is the L flag reset (step S423) and the movement of the cursor once again made possible.

Therefore, even when the speed control ends and the positional control region is inadvertently returned to, the cursor does not move.

Further, it is also possible to use, for example, a timer as another L flag reset factor and reset the flag L when a predetermined time elapses from the point of time when returning from speed control to positional control.

In the block diagram shown in FIG. 46, the cancel processor CAC for canceling the movement of the cursor is added in the processor CPU. With the exception of this point, it is the same as the one shown in FIG. 37.

Further, even with a joystick, the cancel processor CAC is used to cancel the amount of movement corresponding to the amount of return along the X and Y axes, so it is possible to stop reliably at the target position.

CAPABILITY OF EXPLOITATION IN INDUSTRY

The present invention can be applied to a pointing device (X-Y coordinate input device) which can move a cursor or pointer etc. on a display. In particular, it can be applied to a pointing devices as a whole, such as mouses and joysticks, which are convenient to carry and are excellent in operability.

The present invention is particularly useful in the field of office automation for computers, personal computers, word processors, etc.

We claim:

1. A pointing device, having a casing, for moving a position indicating member on a display to any position of the display, said pointing device comprising:
   a positional control means for controlling the position of the position indicating member, wherein said positional control means includes a movable portion movable within said casing, said movable portion controlling the position of the position indicating member while said casing is capable of being kept substantially stationary;
   a speed control means for controlling the speed of movement of the position indicating member; and
   a switching means provided in a circular manner about said movable portion in said casing for switching from positional control to speed control when the movable portion is in contact with said switching means.

2. A pointing device, having a casing, for moving a pointer or a cursor on a display of a computer to any position of the display, said pointing device comprising:
   a slider which can move in any direction, wherein said slider moves within said casing;
   a pointer movement position signal detection means which detects the direction of movement and the amount of movement of the slider while said casing is capable of being kept substantially stationary and outputs a point movement position signal;
   and a pointer movement speed signal output means provided in a circular manner about said slider in said casing which, when the slider contacts said pointer movement speed signal output means, switches the pointer control from positional control to speed control and outputs a pointer movement speed signal.

3. A pointing device as set forth in claim 2, wherein the said pointer movement speed signal output means is a depression switch which is depressed by the movement of the slider.

4. A pointing device as set forth in claim 2, wherein the said pointer movement speed signal output means is a pressure sensor which is depressed by the movement of the slider.

5. A pointing device as set forth in claim 2, wherein the said pointer movement speed signal output means is a rubber switch which is depressed by the movement of the slider.

6. A pointing device as set forth in claim 2, wherein provision is made, in the region where the above-mentioned slider moves and between the region where the pointer movement position signal is output and the region where the pointer movement speed signal is output, of an insensitive zone where the pointer does not move.

7. A pointing device as set forth in claim 2, wherein provision is made of a means for giving a change to the force of operation of the slider, in the region where the slider moves, between the region where the pointer movement position signal is output and the region where the pointer movement speed signal is output.

8. A pointing device as set forth in claim 2, wherein the pointer movement speed signal output means includes a plurality of magnetoelectric conversion elements.

9. A pointing device as set forth in claim 2, wherein said pointer movement position signal output means includes a rotary encoder.

10. A pointing device as set forth in claim 2, wherein said slider is a slider slidable in any direction, wherein said detection means is a detection means for detecting the amount of movement of said slider, said pointing device further comprises at least one button switch, keytops for depressing the button switches, and a case housing the same and by the operation of said button switches when the keytops are depressed from the top direction or the side direction of the case.

11. A pointing device as set forth in claim 10, characterized in that the said case is supported by a support arm which may be bent in any direction at any position.

12. A pointing device as set forth in claim 11, wherein the said support arm is provided with a connection groove and in that the said case is provided with a ratchet pawl which can engage and disengage with respect to the said connection groove so as to attach or detach the said case with respect to the support arm.

13. A pointing device as set forth in claim 2, wherein said slider is a slider slidable in any direction, wherein said detection means is a detection means for detecting the amount of movement of the said slider, said pointing device further comprising at least one button switch, keytops for depressing the button switches, and a ring portion which can be worn on a finger and by the fact that when worn on the index finger, said slider and the keytops can be operated by the thumb.

14. A pointing device as set forth in claim 13, wherein said ring portion is provided with a stopper for stopping the finger and a spring for pushing and biasing the said stopper.

15. A pointing device as set forth in claim 2, wherein said slider is a slider slidable in any direction, wherein said detection means is a detection means for detecting the amount of movement of the said slider, said pointing device further comprising at least one button switch, and a case housing the same and by the fact that said case is a substantially rectangularly shaped box and has a projection at one end of a bottom thereof, with the said slider being disposed at the opposing surface.

16. A pointing device as set forth in claim 15, wherein keytops for depressing the said button switches are disposed at a corner portion of said projection of the said case and in that the said keytops are made to abut against the fingertips when the case is supported by the hand.

17. A pointing device as set forth in claim 15, wherein provision is made of a slanted surface at an end portion of the said projection and a part running along the long side of the case, forming the same surface with the same, wherein when the said slanted surface is turned downward and laid on a horizontal surface, the device is held so that the surface where the said slider is provided faces upward and forms a slanted surface and wherein the said slider can be operated by the thumb and the said keytops can be operated by the index finger and middle finger.

18. A pointing device as set forth in claim 15, wherein a cable for transmitting pointing information from the device to the computer body is provided at the side opposite to the said keytops of the side surface of the projection of the case and is at a position not touching the fingers during a pointing operation.

19. A pointing device as set forth in claim 15, wherein the said case is supported by a support arm which can be bent at any position in any direction.

20. A pointing device, having a casing, for moving a pointer or a cursor on a display of a computer to any position of the display, comprising:
- a slider which can move in at least an X direction and Y direction, wherein said slider moves within said casing;
- a detector provided in a circular manner about said slider in said casing, wherein said detector detects the position of the said slider in the X direction and Y direction along with a movement of said slider relative to said casing while said casing is capable of being kept substantially stationary; and
- a processor which has a position information memory which successively stores position information obtained by said detector at predetermined timings and a vector processing unit which compares the latest position information and the preceding position information stored by said position memory so as to compute the relative positional relationship of the two and outputs a signal for moving the cursor or pointer on the display based on the results of the same.

21. A method of control of a pointing device, having a casing, for moving a cursor or pointer on a display to any position on the display, comprising the steps of:
- controlling said cursor or pointer by moving a slider while said casing is capable of being kept substantially stationary;
- detecting, with a detector provided in a circular manner about the slider in the casing, position of the slider;
- storing the position information of the slider relative to said casing at predetermined intervals; and
- comparing the latest position information and the preceding position information, and thereby detecting the relative positions of the two and moving the cursor or pointer.

22. A method of control as set forth in claim 21, further comprising the step of switching between positional control and speed control of the cursor or pointer in accordance with the range of movement of the slider.

23. A method of control as set forth in claim 22, further comprising the step of controlling the range of movement of the slider by the output value of a pressure sensor actuated by the slider.

24. A method of control as set forth in claim 23, further comprising the step of executing positional control when the output value of the pressure sensor is less than a predetermined threshold value and by executing speed control when it is more than the predetermined value.

25. A method of control as set forth in claim 23, wherein when shifting from positional control to speed control, the latest positional information and the preceding positional information are used to find the vector between the two positions of the same and the vector is corrected in angle by exactly a predetermined angle while the slider is in the speed control region.

26. A method of control as set forth in claim 25, wherein the predetermined angle is determined by the center of the positional control region, the point of change from positional control to speed control, and the direction of movement of the slider.

27. A method of control as set forth in claim 23, wherein when the latest position information and the preceding position information approach each other more than a predetermined value, the preceding position information is replaced by fixed position information further preceding it from the latest position information.

28. A method of control as set forth in claim 27, wherein the said fixed information position is a point between the center of the positional control region and the point of change from the positional control region to the speed control region.

29. A method of control as set forth in claim 20, wherein when the slider is moved from an initial position to a predetermined position and then returned toward the initial position, the output of the movement signal of the cursor or pointer is canceled so as not to move the cursor or pointer.

30. A method of control as set forth in claim 29, wherein when returning from an initial position in the speed control region to the positional control region, the movement signal is canceled until the movement of the slider stops.

* * * * *